(12) United States Patent
Wang et al.

(10) Patent No.: US 8,003,875 B2
(45) Date of Patent: Aug. 23, 2011

(54) PLAYBACK APPARATUS, PLAYBACK METHOD AND PROGRAM

(75) Inventors: QiHong Wang, Tokyo (JP); Akiko Terayama, Tokyo (JP); Takaomi Kimura, Tokyo (JP); Ryo Mukaiyama, Tokyo (JP)

(73) Assignee: Sony Corporation, Tokyo (JP)

( * ) Notice: Subject to any disclaimer, the term of this patent is extended or adjusted under 35 U.S.C. 154(b) by 100 days.

(21) Appl. No.: 12/547,133

(22) Filed: Aug. 25, 2009

(65) Prior Publication Data

US 2010/0057235 A1   Mar. 4, 2010

(30) Foreign Application Priority Data

Aug. 27, 2008   (JP) ................. P2008-218115

(51) Int. Cl.
*G10H 1/00* (2006.01)
*G10H 1/18* (2006.01)

(52) U.S. Cl. ............ 84/615; 84/600; 84/601; 84/610; 84/618; 84/634; 84/644; 84/653; 84/658; 84/666; 84/670

(58) Field of Classification Search .............. None
See application file for complete search history.

(56) References Cited

U.S. PATENT DOCUMENTS

| | | | |
|---|---|---|---|
| 5,331,111 A * | 7/1994 | O'Connell ............ | 84/602 |
| 7,786,366 B2 * | 8/2010 | Moffatt ............... | 84/600 |
| 2001/0035087 A1 * | 11/2001 | Subotnick ............. | 84/600 |
| 2003/0159567 A1 * | 8/2003 | Subotnick ............. | 84/626 |
| 2007/0277123 A1 * | 11/2007 | Shin et al. ............ | 715/863 |
| 2007/0277126 A1 * | 11/2007 | Park et al. ........... | 715/866 |
| 2007/0279394 A1 * | 12/2007 | Lampell et al. ....... | 345/173 |
| 2008/0018616 A1 * | 1/2008 | Lampell et al. ....... | 345/173 |
| 2009/0213086 A1 * | 8/2009 | Chae et al. ........... | 345/173 |
| 2009/0315836 A1 * | 12/2009 | Pihlaja ............... | 345/173 |
| 2009/0322498 A1 * | 12/2009 | Yun et al. ............ | 340/407.2 |
| 2009/0322695 A1 * | 12/2009 | Cho et al. ............ | 345/173 |
| 2010/0011317 A1 * | 1/2010 | Lee .................. | 715/784 |
| 2010/0101872 A1 * | 4/2010 | Ikeda et al. .......... | 178/18.01 |
| 2010/0114974 A1 * | 5/2010 | Jung et al. ........... | 707/802 |
| 2010/0137026 A1 * | 6/2010 | Kim et al. ............ | 455/556.1 |
| 2010/0271320 A1 * | 10/2010 | Eckl et al. ........... | 345/173 |
| 2010/0279738 A1 * | 11/2010 | Kim et al. ............ | 455/566 |
| 2011/0012926 A1 * | 1/2011 | Kerr et al. ........... | 345/649 |
| 2011/0021251 A1 * | 1/2011 | Linden ............... | 455/566 |
| 2011/0021272 A1 * | 1/2011 | Grant et al. .......... | 463/30 |

FOREIGN PATENT DOCUMENTS

| | | |
|---|---|---|
| JP | 2006-007919 | 1/2006 |
| JP | 2006-049271 | 2/2006 |
| JP | 2006-155474 | 6/2006 |
| JP | 2006-185443 | 7/2006 |
| JP | 2006-345209 | 12/2006 |
| JP | 2007-536669 | 12/2007 |

* cited by examiner

*Primary Examiner* — Marlon T Fletcher

(74) *Attorney, Agent, or Firm* — Finnegan, Henderson Farabow, Garret & Dunner LLP

(57) ABSTRACT

A playback apparatus is provided that includes an operation plane, a detection unit to detect which of contact relationship including first contact relationship, second contact relationship with a higher degree of contact than the first contact relationship and third contact relationship with a higher degree of contact than the second contact relationship the operation plane and an operation object have, a creation unit to create a list screen of content data for selecting content data based on movement of the operation object with respect to the operation plane in the first contact relationship, a playback unit to play back content data, and a playback control unit to cause the playback unit to play back content data selected on the list screen when becoming the second contact relationship from the first contact relationship if contact relationship becomes the third contact relationship from the second contact relationship.

13 Claims, 20 Drawing Sheets

FIG. 13
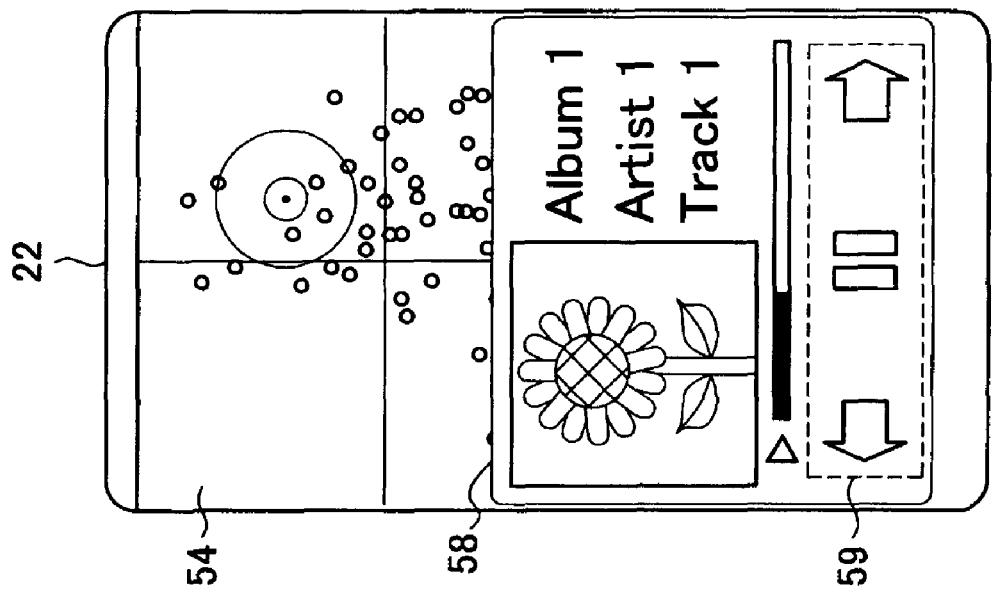
MODE CHANGE
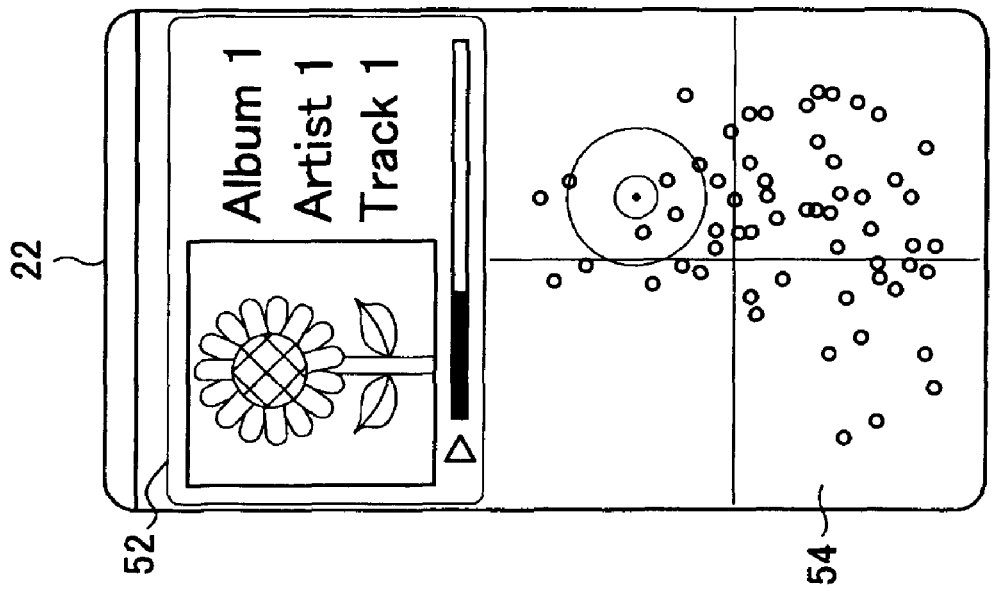

PLAYBACK APPARATUS, PLAYBACK METHOD AND PROGRAM

BACKGROUND OF THE INVENTION

1. Field of the Invention

The present invention relates to a playback apparatus, a playback method and a program.

2. Description of the Related Art

Playback apparatus of music data such as a cellular phone and a portable music playback device are widely used today. Further, playback apparatus are increasingly equipped with a touch pad or a touch panel for detecting the movement of a user's finger.

For example, a playback apparatus with a touch pad detects the pressure of a finger on the touch pad and plays back music data corresponding to the pressed position of the touch pad. Likewise, a playback apparatus with a touch panel detects the pressure of a finger on the touch panel and plays back music data corresponding to the pressed position of the touch panel. Those playback apparatus play back music data that corresponds to the barycentric position of the pressure by a finger, for example. A technique of detecting the pressure by a finger or a contact area with a finger is disclosed in Japanese Unexamined Patent Publication No. 2006-345209, for example.

SUMMARY OF THE INVENTION

However, if the finger that has been in contact with the touch pad or the touch panel presses the touch pad or the touch panel, the contact area and the barycentric position of the finger on the touch pad or the touch panel would change. Therefore, it is assumed in the above playback apparatus that music data that is different from music data selected at the time when the finger has been in contact with the touch pad or the touch panel would be played back when the touch pad or the touch panel is pressed. Thus, it is assumed that music data that is different from music data intended by a user would be played back.

In light of the foregoing, it is desirable to provide a novel and improved playback apparatus, playback method and program capable of reflecting user's intention on operations more accurately.

According to an embodiment of the present invention, there is provided a playback apparatus that includes an operation plane, a detection unit to detect which of contact relationship including first contact relationship, second contact relationship with a higher degree of contact than the first contact relationship and third contact relationship with a higher degree of contact than the second contact relationship the operation plane and an operation object have, a creation unit to create a list screen of content data allowing selection of content data based on movement of the operation object with respect to the operation plane when the operation plane and the operation object have the first contact relationship, a playback unit to play back content data, and a playback control unit to cause the playback unit to play back content data, which is selected on the list screen when contact relationship between the operation plane and the operation object becomes the second contact relationship from the first contact relationship, if contact relationship between the operation plane and the operation object becomes the third contact relationship from the second contact relationship.

In the above playback apparatus, one or more than one content data may be associated with a position on the list screen according to a feature of each content data, and content data associated with a position in closest proximity to a position on the list screen specified by movement of the operation object may be selected while the operation plane and the operation object are in the first contact relationship.

The playback control unit may cause the playback unit to play back content data selected while the operation plane and the operation object are in the first contact relationship from a particular part of the content data.

A shift amount of the position on the list screen specified by movement of the operation object with respect to the operation plane may become smaller in relation to the same movement of the operation object as a degree of contact between the operation plane and the operation object increases.

A moving speed of the position on the list screen specified by movement of the operation object with respect to the operation plane may become lower in relation to the same movement of the operation object as a degree of contact between the operation plane and the operation object increases.

The creation unit may create an image display screen containing images respectively indicating selected content data and content data associated with a peripheral position of the content data, in addition to the list screen.

The creation unit may enlarge the images contained in the image display screen as a degree of contact between the operation plane and the operation object increases.

The creation unit may create a playback screen of content data to be played back when contact relationship between the operation plane and the operation object becomes the third contact relationship.

The creation unit may enlarge a peripheral part of selected content data on the list screen and display an image indicating content data associated with the peripheral part in a corresponding position when contact relationship between the operation plane and the operation object becomes the second contact relationship.

The detection unit may detect contact relationship between the operation plane and the operation object based on at least one of pressure on the operation plane and a contact area of the operation object with the operation plane.

The first contact relationship may be relationship where the operation plane and the operation object are separated.

The playback apparatus may further include a vibration control unit to vibrate a vibrator according to beat of content data being played back by the playback unit.

According to another embodiment of the present invention, there is provided a playback method that includes the steps of detecting which of contact relationship including first contact relationship, second contact relationship with a higher degree of contact than the first contact relationship and third contact relationship with a higher degree of contact than the second contact relationship an operation plane and an operation object have, creating a list screen of content data allowing selection of content data based on movement of the operation object with respect to the operation plane when the operation plane and the operation object have the first contact relationship, and playing back content data selected on the list screen when contact relationship between the operation plane and the operation object becomes the second contact relationship from the first contact relationship if contact relationship between the operation plane and the operation object becomes the third contact relationship from the second contact relationship.

According to another embodiment of the present invention, there is provided a program for causing a computer to function as a playback apparatus that includes an operation plane, a detection unit to detect which of contact relationship including first contact relationship, second contact relationship with a higher degree of contact than the first contact relationship and third contact relationship with a higher degree of contact than the second contact relationship the operation plane and an operation object have, a creation unit to create a list screen of content data allowing selection of content data based on movement of the operation object with respect to the operation plane when the operation plane and the operation object have the first contact relationship, a playback unit to play back content data, and a playback control unit to cause the playback unit to play back content data selected on the list screen when contact relationship between the operation plane and the operation object becomes the second contact relationship from the first contact relationship if contact relationship between the operation plane and the operation object becomes the third contact relationship from the second contact relationship.

According to the embodiments of the present invention described above, it is possible to reflect user's intention on operations more accurately.

BRIEF DESCRIPTION OF THE DRAWINGS

FIG. 13 is an explanatory view showing switching between a playback screen and a playback control screen.

DETAILED DESCRIPTION OF THE PREFERRED EMBODIMENTS

Figure 1:
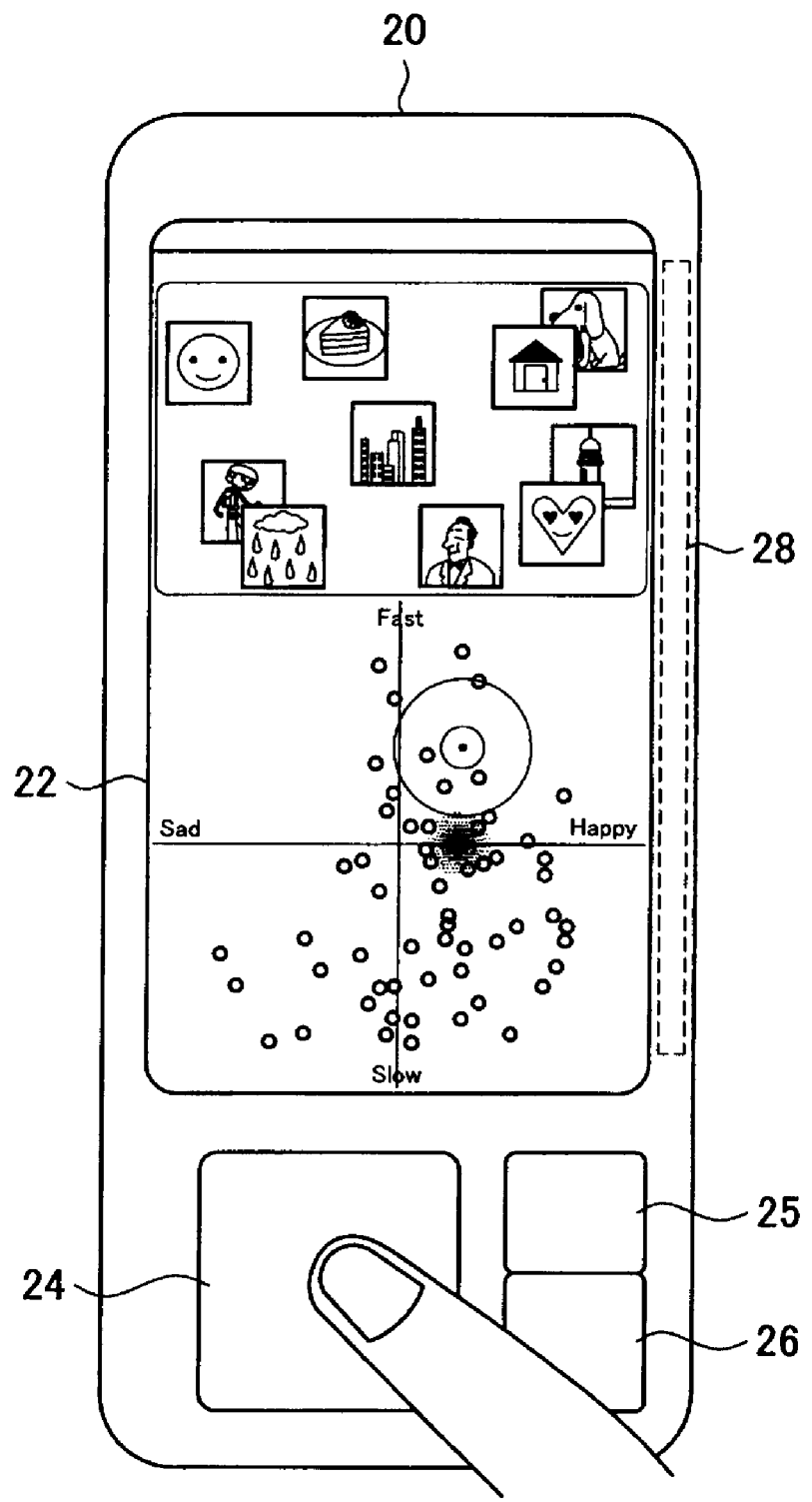
FIG. 1 is an explanatory view showing the external structure of a playback apparatus according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

A preferred embodiment of the present invention will be described hereinafter in the following order:

1. External Structure of Playback Apparatus according to Embodiment
2. Function of Playback Apparatus according to Embodiment
  2-1. Detection of User Operation
  2-2. Transition of Display Screen
  2-3. Adjustment of Playback Volume
  2-4. Adjustment of Sensitivity for Operation
  2-5. Adjustment of Moving Speed of Point Position for Operation
  2-6. Vibration Control based on Beat
3. Operation of Playback Apparatus according to Embodiment
4. Other Examples of Operation
  4-1. Alternative Example of Switching of Display Screens
  4-2. Coordinate Plan in Selection Screens
  4-3. Change in Coordinate Axis Parameter in Coordinate Plan
5. Summary 1. External Structure of Playback Apparatus According to Embodiment Referring first to FIG. 1, the external structure of a playback apparatus 20 according to an embodiment is described hereinafter.

FIG. 1 is an explanatory view showing the external structure of the playback apparatus 20 according to the embodiment. As shown in FIG. 1, the playback apparatus 20 includes a display unit 22, a main pad 24, a mode change pad 25, a back pad 26 and a volume control pad 28.

The playback apparatus 20 stores a plurality of pieces of content data, and it can play back the content data selected by a user. The content data may be arbitrary data like music data such as music, a lecture and a radio program, video data such as a movie, a television program, a video program, a photograph, a document, a picture and a chart, a game, software, and so on. Hereinafter, the case where the content data is music data is mainly described by way of illustration.

On the display unit 22, a list screen (a song list, a coordinate plan of music data etc., which are described later) of music data stored in the playback apparatus 20, for example, is displayed. A user can designate playback of desired music data by moving the finger in contact with the main pad 24 on the list screen. The functions and uses of the mode change pad 25, the back pad 26 and the volume control pad 28 are described later in <2. Function of Playback Apparatus according to Embodiment>.

The finger of a user is just an example of an operation object to come into contact with the main pad 24, and the operation object may be any object such as a pen-like object, for example. Further, although the case where the playback apparatus 20 is equipped with the touch pads such as the main pad 24 and the mode change pad 25 is described above, a user operation may be received by a touch panel as in a playback apparatus 30 according to an alternative example shown in FIG. 2.

Figure 2:
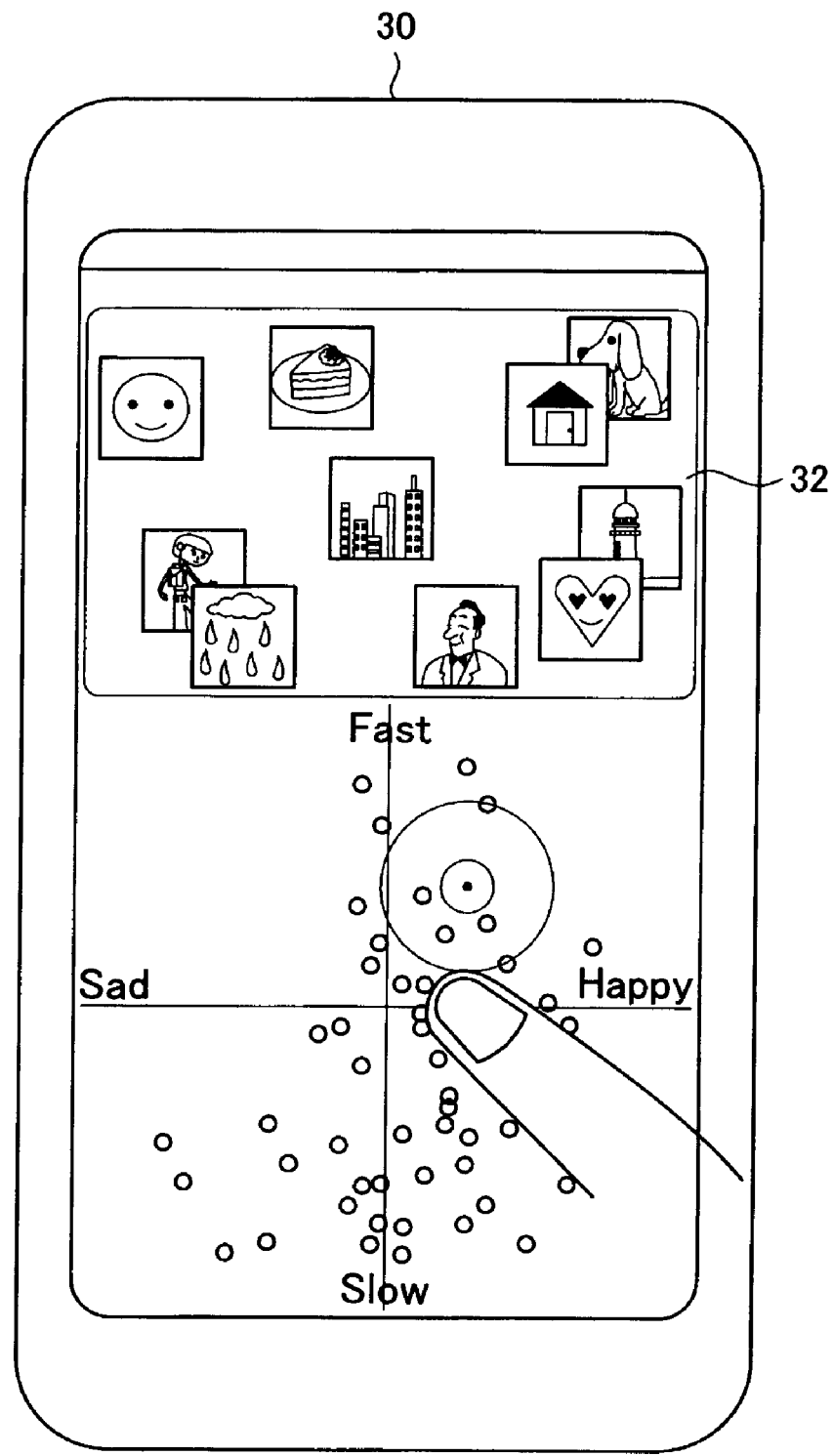
FIG. 2 is an explanatory view showing the external structure of a playback apparatus according to an alternative example.

FIG. 2 is an explanatory view showing the external structure of the playback apparatus 30 according to the alternative example. As shown in FIG. 2, the playback apparatus 30 according to the alternative example includes a display unit 32 and further includes a touch panel on the front or back side of the display unit 32. The playback apparatus 30 according to the alternative example detects the movement of a user's finger by the touch panel and operates based on the movement of the finger. Although the playback apparatus 20 with the touch pad is described hereinafter in detail, the present invention may be applied equally to the playback apparatus 30 with the touch panel.

Circumstances of Development of Embodiment

A playback apparatus with a touch pad related to an embodiment detects whether the touch pad and a finger are in contact with each other, and if they are in contact, it focuses particular music data based on the position of contact between the touch pad and the finger. Then, the playback apparatus plays back the focused music data in response to tapping on the touch pad. Further, a playback apparatus with a touch panel related to an embodiment detects tapping and plays back music data corresponding to the tapped position on the touch panel.

As another example, a playback apparatus with a touch pad that detects the pressure of a finger on the touch pad and plays back music data corresponding to the pressed position on the touch pad is possible. Likewise, a playback apparatus with a touch panel that detects the pressure of a finger on the touch panel and plays back music data corresponding to the pressed position on the touch panel is also possible.

The playback apparatus related to the embodiment plays back music data that corresponds to the barycentric position of the pressure by a finger, for example. However, if the finger that has been in contact with the touch pad or the touch panel presses the touch pad or the touch panel, the contact area and the barycentric position of the finger on the touch pad or the touch panel would change. Therefore, it is assumed in the playback apparatus related to the embodiment that, when the touch pad or the touch panel is pressed, music data that is different from music data selected at the time when the finger has been in contact with the touch pad or the touch panel would be played back. Thus, it is assumed that music data that is different from music data intended by a user would be played back. Further, because switching from a music data selection screen to a playback screen is monotony in the playback apparatus related to the embodiment, it has been desired to improve transition from a music data selection screen to a playback screen.

Given such circumstances, the playback apparatus 20 according to the embodiment has been invented. The playback apparatus 20 according to the embodiment can perform operation that accurately reflects user's intension. Further, the playback apparatus 20 can provide abundant user interface and user experience by continuously changing display contents according to the degree of contact between the finger and the touch pad and performing preview playback when playing back music data. The playback apparatus 20 according to the embodiment is described hereinafter in detail.

2. Function of Playback Apparatus According to Embodiment

Figure 3:
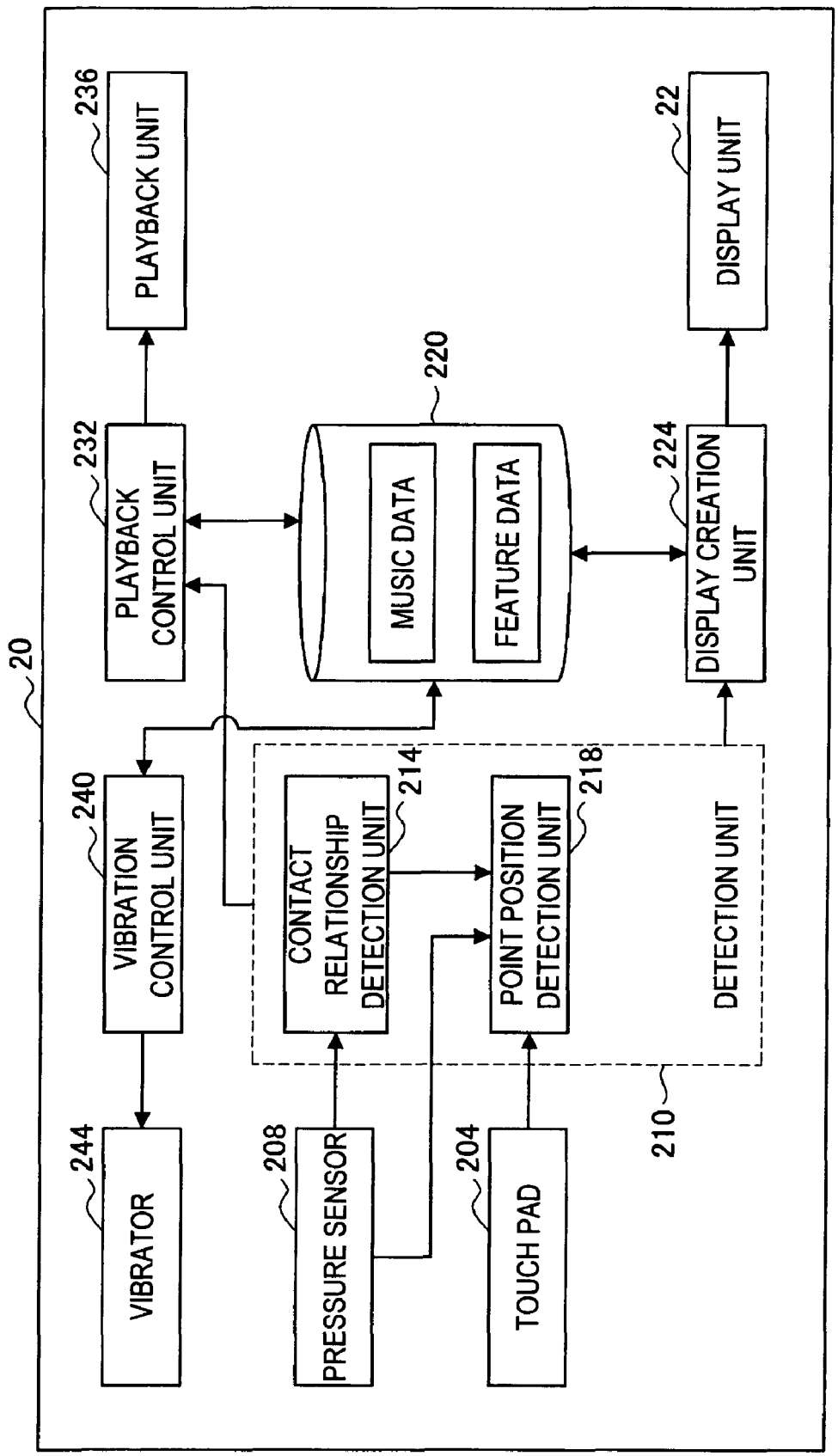
FIG. 3 is a functional block diagram showing the structure of a playback apparatus according to an embodiment.

FIG. 3 is a functional block diagram showing the structure of the playback apparatus 20 according to the embodiment. As shown in FIG. 3, the playback apparatus 20 includes a touch pad 204, a pressure sensor 208, a detection unit 210, a storage unit 220, a display creation unit 224, a playback control unit 232, a playback unit 236, a vibration control unit 240 and a vibrator 244.

2-1. Detection of User Operation

The touch pad 204 corresponds to the main pad 24, the mode change pad 25, the back pad 26 and the volume control pad 28 shown in FIG. 1, and it functions as an operation plane that is operated by a user's finger. For example, the touch pad 204 detects the movement of the finger on the touch pad 204 by a change in capacitance generated between the user's finger and the touch pad 204.

The pressure sensor 208 is placed on a non-operation plane of the touch pad 204 and detects the pressure applied on the touch pad 204. An example of arrangement of the pressure sensor 208 is shown in FIG. 4.

Figure 4:
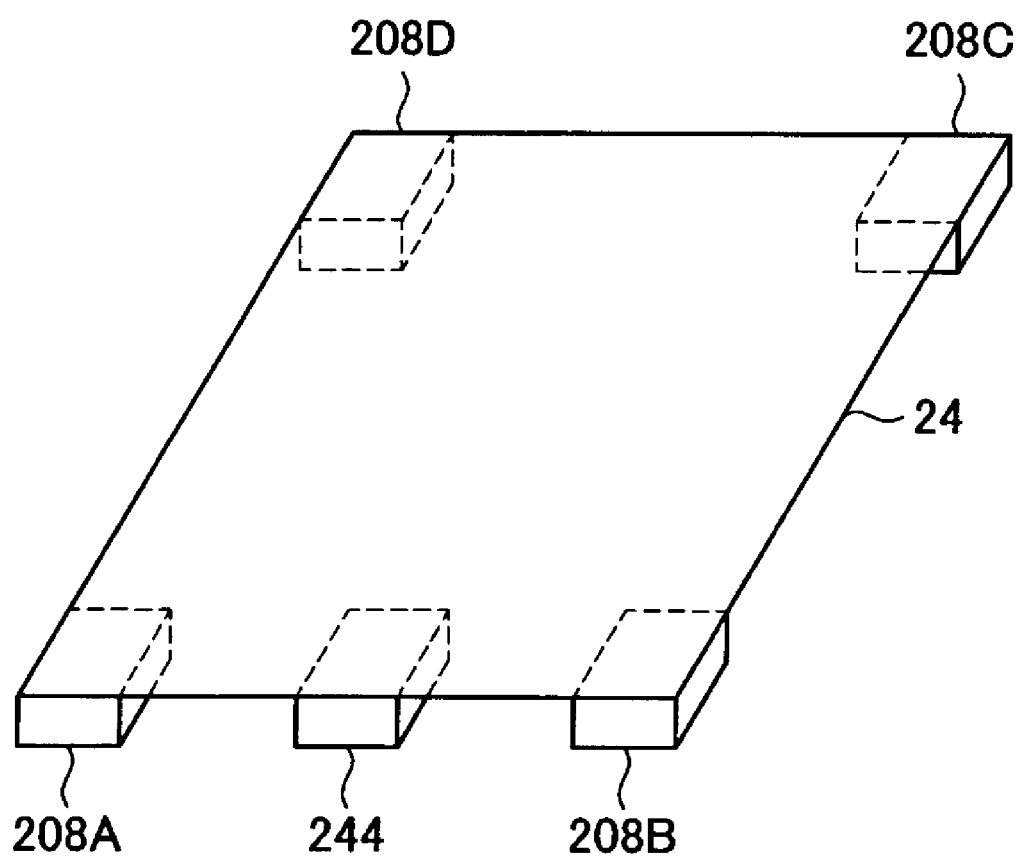
FIG. 4 is an explanatory view showing an example of arrangement of pressure sensors.

FIG. 4 is an explanatory view showing an example of arrangement of the pressure sensor 208. As shown in FIG. 4, pressure sensors 208A to 208D are placed at the four corners of the main pad 24. Further, the vibrator 244, which is described later, is also placed on the non-operation plane of the main pad 24.

The detection unit 210 includes a contact relationship detection unit 214 and a point position detection unit 218. The contact relationship detection unit 214 has a function as a detection unit that detects which of "touch" (first contact relationship), "light push" (second contact relationship) and "hard push" (third contact relationship) the contact relationship between the main pad 24 and a finger is.

Figure 5:
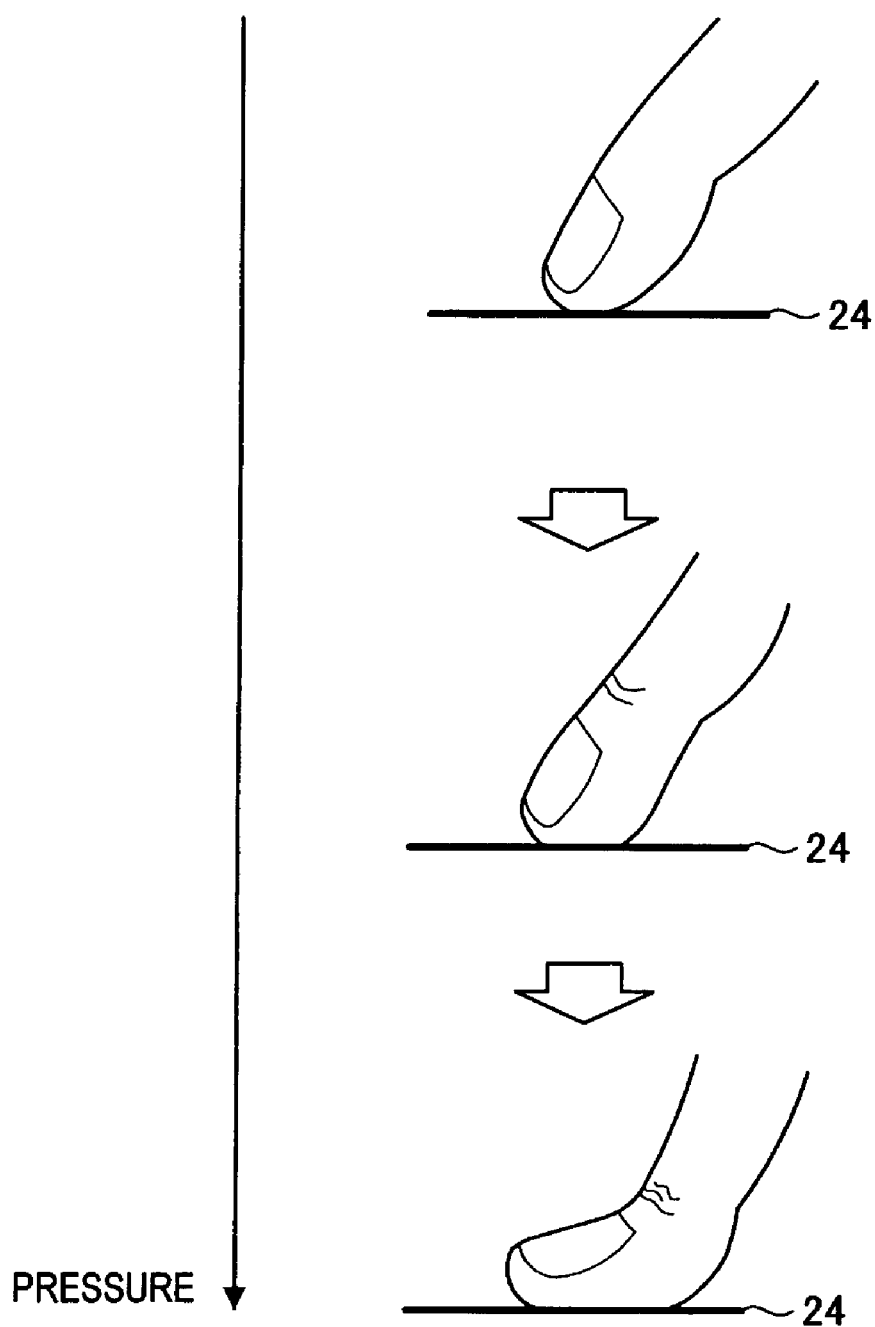
FIG. 5 is an explanatory view showing contact relationship between a main pad and a finger.

FIG. 5 is an explanatory view showing contact relationship between the main pad 24 and a finger. As shown in the upper part of FIG. 5, the state where a finger is in contact with the main pad 24 corresponds to "touch". As shown in the middle part of FIG. 5, the state where a finger presses the main pad 24 and the degree of contact (degree of pressing) between the finger and the main pad 24 is higher than that of "touch" corresponds to "light push". As shown in the lower part of FIG. 5, the state where a finger presses the main pad 24 more strongly and the degree of contact between the finger and the main pad 24 is higher than that of "light push" corresponds to "hard push".

In order to detect such contact relationship between the main pad 24 and a finger, the contact relationship detection unit 214 first calculates an average value of the pressure detected by the pressure sensors 208A to 208D. If the average value is larger than 0 and smaller than a threshold between "touch" and "light push", the contact relationship detection unit 214 detects that the main pad 24 and the finger are in the contact relationship "touch". On the other hand, if the average value is larger than the threshold between "touch" and "light push" and smaller than a threshold between "light push" and "hard push", the contact relationship detection unit 214 detects that the main pad 24 and the finger are in the contact relationship "light push". Further, if the average value is larger than the threshold between "light push" and "hard push", the contact relationship detection unit 214 detects that the main pad 24 and the finger are in the contact relationship "hard push".

The point position detection unit 218 detects a point position on a display screen that is specified by the movement of a user's finger detected by the main pad 24. The detail is described later in [2-4. Adjustment of Sensitivity for Operation]. An example of use of detection results by the contact relationship detection unit 214 and the point position detection unit 218 is described hereinafter with reference to FIG. 6.

Figure 6:
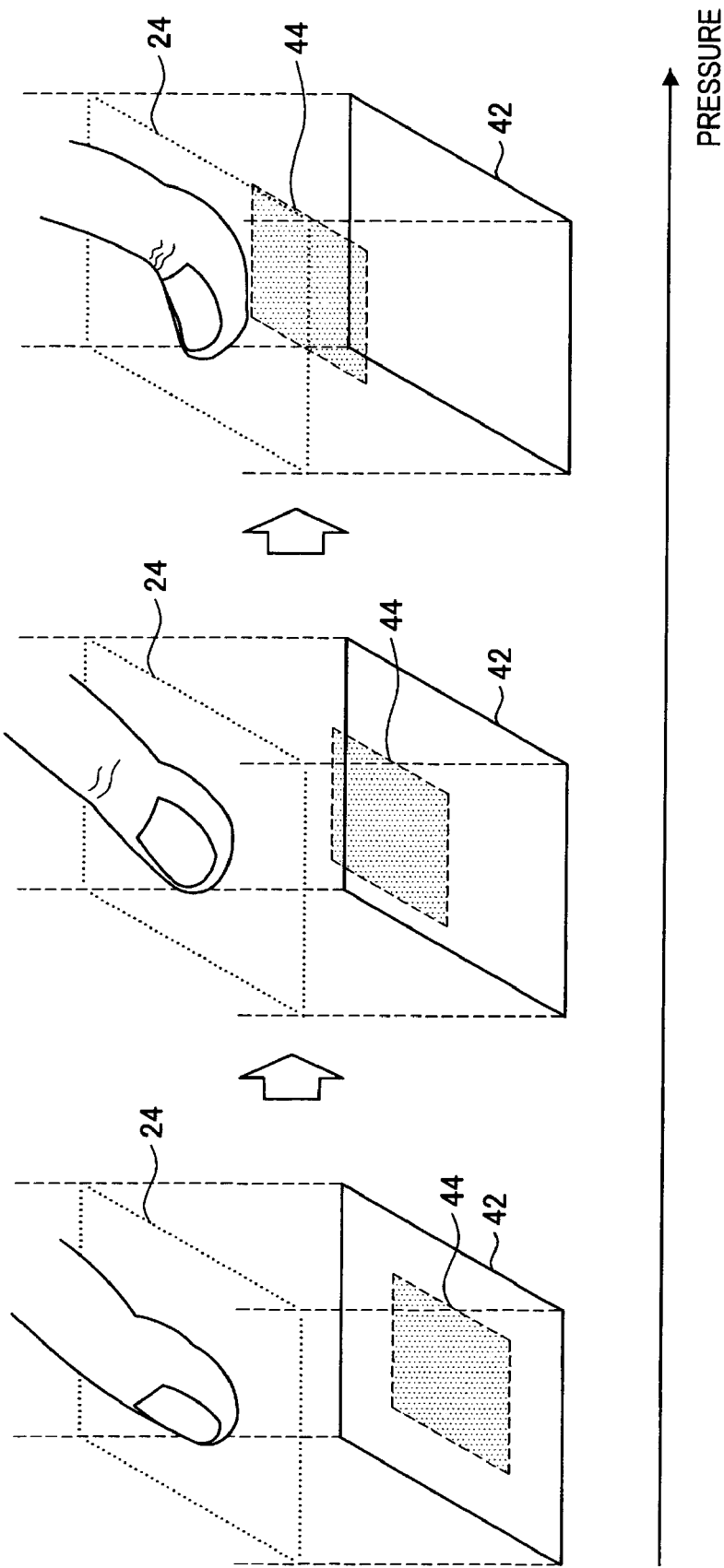
FIG. 6 is an explanatory view conceptually showing use of contact relationship between a finger and a main pad.

FIG. 6 is an explanatory view conceptually showing use of contact relationship between a finger and the main pad 24. As shown in FIG. 6, the playback apparatus 20 visually raises an object 44 such as an icon or an image which exists at the point position by a finger from a background screen 42 of the display unit 22 according to the contact relationship. Specifically, if the contact relationship is "touch", the object 44 slightly rises, and if the contact relationship becomes "light push", the object 44 rises and becomes stable. Then, the object 44 further rises until the contact relationship becomes "hard push", and if the contact relationship becomes "hard push", the object 44 falls to the background screen 42. In such a structure, it is possible to provide images that the object varies gradually (or continuously) to a user who "hard-pushes" the main pad 24.

Figure 7:
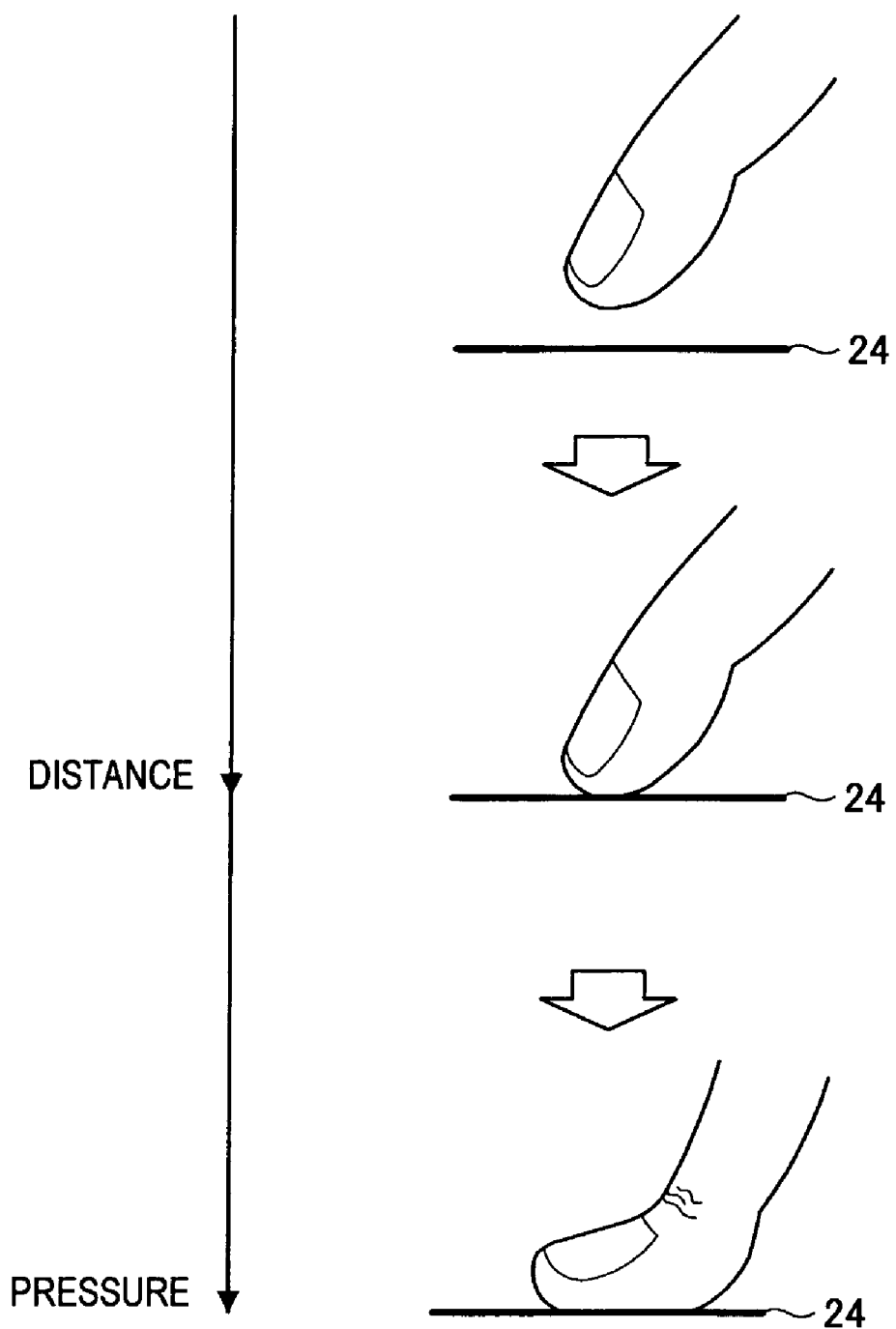
FIG. 7 is an explanatory view showing another example of contact relationship between a main pad and a finger.
Figure 8:
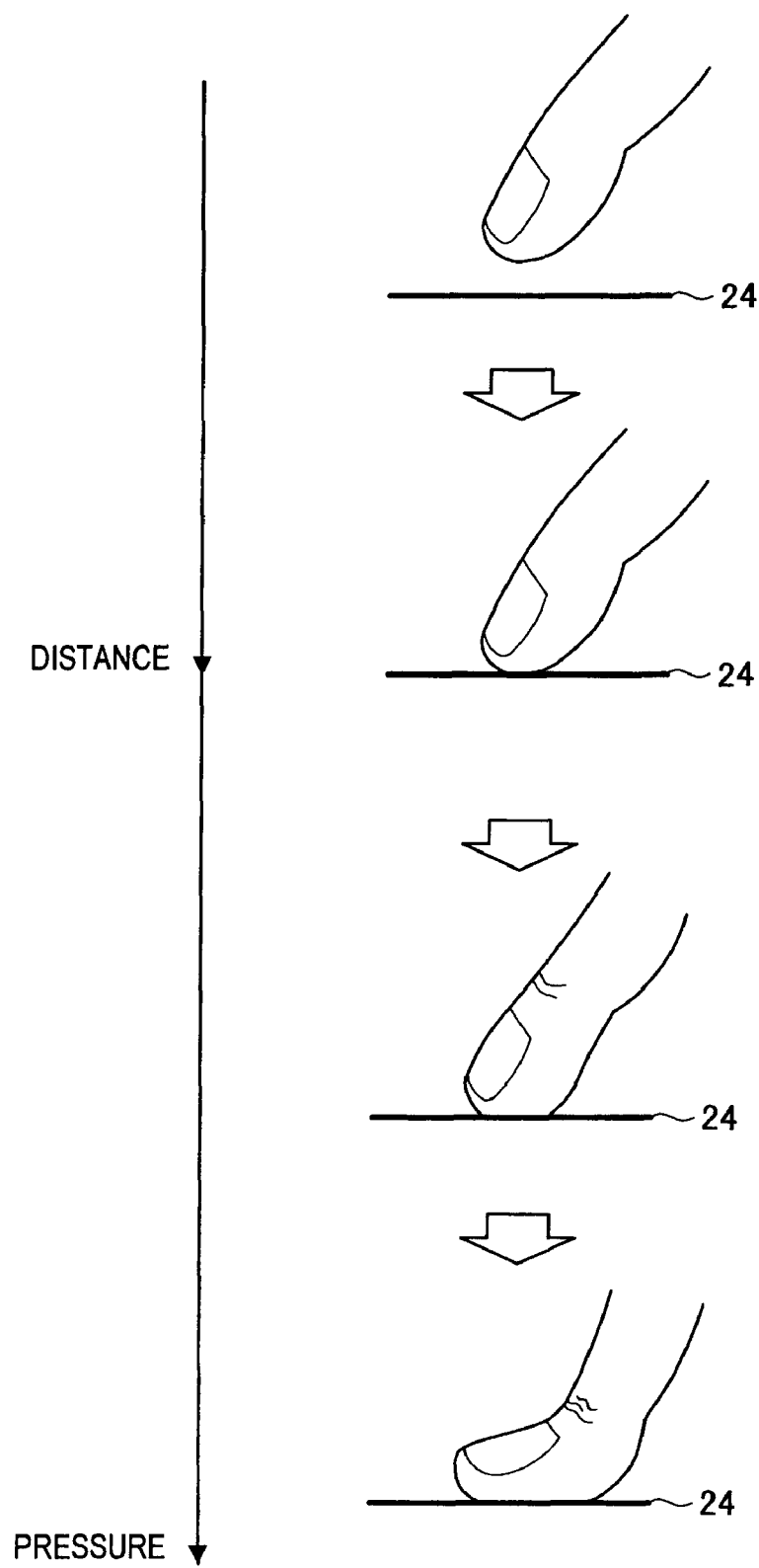
FIG. 8 is an explanatory view showing another example of contact relationship between a main pad and a finger.

Although the case where the contact relationship detection unit 214 detects which of "touch", "light push" and "hard push" the contact relationship between the main pad 24 and a finger corresponds to is described above, the present invention is not limited thereto, as shown in FIGS. 7 and 8.

FIG. 7 is an explanatory view showing another example of contact relationship between the main pad 24 and a finger. As shown in the upper part of FIG. 7, the state where the finger is in close proximity to but not in contact with the main pad 24 corresponds to "over". The middle part of FIG. 7 corresponds to "touch", and the lower part of FIG. 7 corresponds to "hard push". The contact relationship detection unit 214 may detect which of "over", "touch" and "hard push" shown in FIG. 7 the contact relationship between the main pad 24 and a finger is. The contact relationship detection unit 214 may detect the contact relationship "over" based on capacitance generated between the finger and the touch pad 204.

FIG. 8 is an explanatory view showing another example of contact relationship between the main pad 24 and a finger. The states shown in FIG. 8 correspond to "over", "touch", "light push" and "hard push", respectively, from above. The contact relationship detection unit 214 may detect which of "over", "touch", "light push" and "hard push" shown in FIG. 8 the contact relationship between the main pad 24 and a finger is. The playback apparatus 20 may display prescribed information (title etc.) of the music data corresponding to the point position when the contact relationship is "over", and perform preview playback of the music data corresponding to the point position when the contact relationship is "touch". Further, the playback apparatus 20 may select the music data corresponding to the point position as a playback target (processing target) when the contact relationship becomes "light push", and playback (process) the music data selected as a playback target when the contact relationship becomes "hard push".

Further, although the case of detecting the contact relationship between a user's finger and the main pad 24 with use of the pressure sensor 208 is described above, the present invention is not limited thereto. For example, because it is considered that the contact area between a finger and the main pad 24 becomes larger as the pressure by the finger on the main pad 24 increases, the playback apparatus 20 may detect the contact relationship between a user's finger and the main pad 24 based on the contact area between the finger and the main pad 24. Further, it is also feasible to improve the detection accuracy of the contact relationship between a finger and the main pad 24 by combining the uses of the contact area between the finger and the main pad 24 and the pressure sensor 208.

2-2. Transition of Display Screen

The display creation unit 224 shown in FIG. 3 has a function as a creation unit that creates a display screen according to a detection result by the detection unit 210 and displays it on the display unit 22. The storage unit 220 stores a plurality of pieces of music data and feature data indicating the feature of each music data. The storage unit 220 may be a storage medium such as nonvolatile memory, a magnetic disk, an optical disc or an MO (Magneto Optical) disk. Examples of the nonvolatile memory are EEPROM (Electrically Erasable Programmable Read-Only Memory), EPROM (Erasable Programmable ROM) and so on. Examples of the magnetic disk are a hard disk, a discoid magnetic disk and so on. Examples of the optical disc are CD (Compact Disc), DVD-R (Digital Versatile Disc Recordable), BD (Blu-ray Disc (registered trademark)) and so on. Further, a method of acquiring the music data and the feature data by the playback apparatus 20 is arbitrary, and the data may be acquired from another information processing apparatus or from a content server connected through a network.

Figure 9:
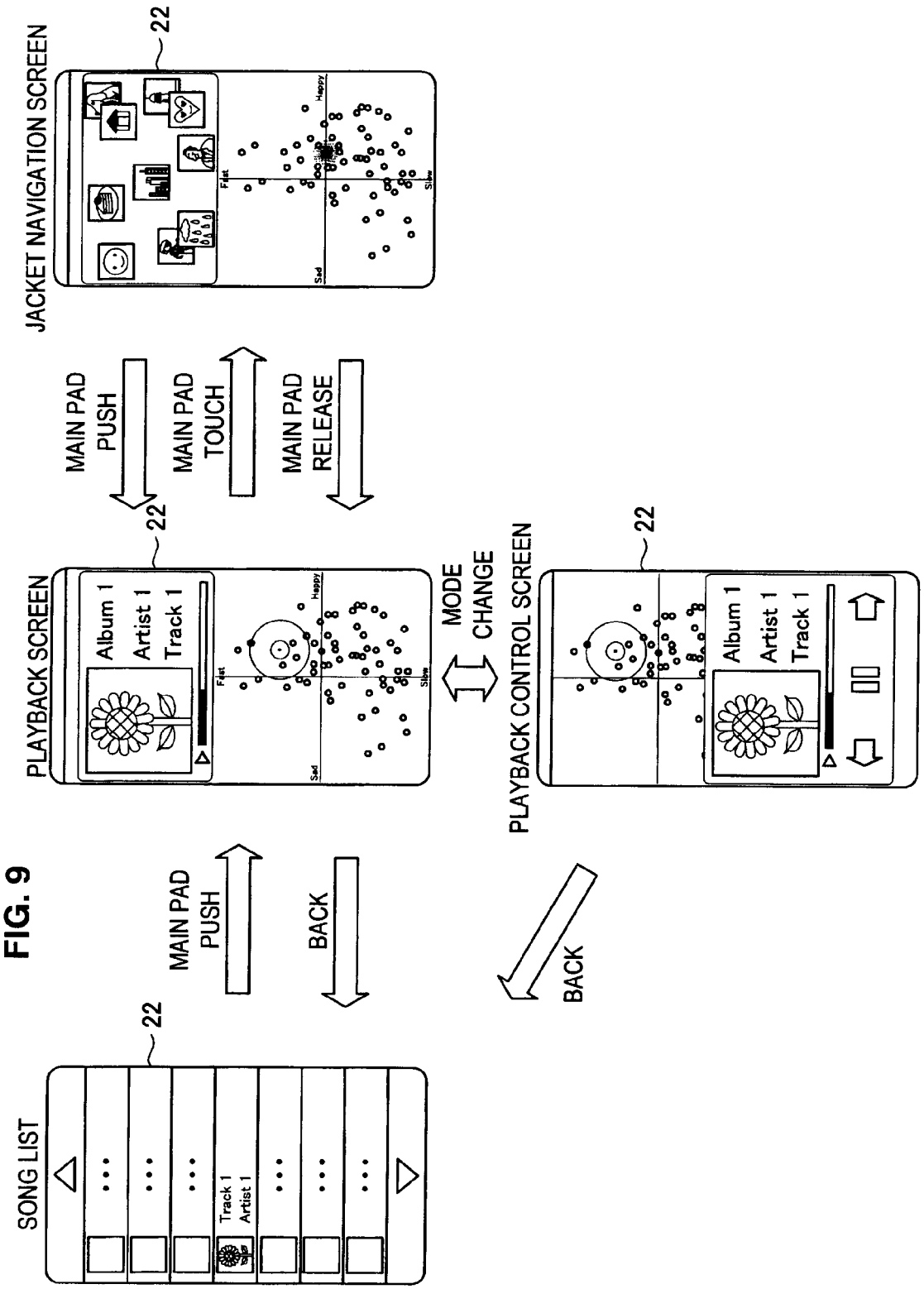
FIG. 9 is an explanatory view showing a specific example of various display screens displayed by a display creation unit.

The display creation unit 224 reads the data stored in the storage unit 220 according to a detection result by the detection unit 210 and creates a song list, a playback screen, a jacket navigation screen and a playback control screen shown in FIG. 9, for example.

Figure 11:
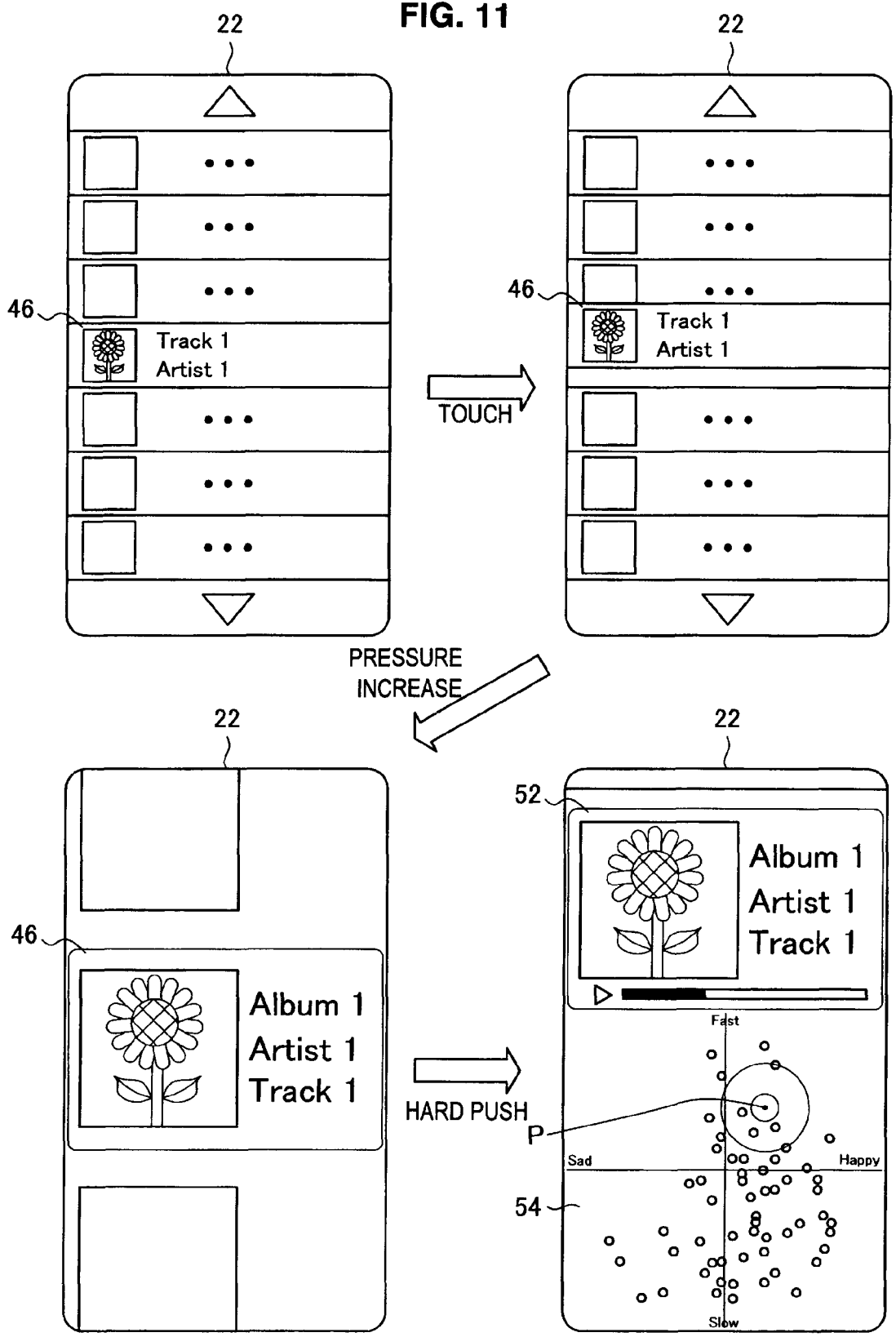
FIG. 11 is an explanatory view showing gradual switching from a song list to a playback screen.

FIG. 9 is an explanatory view showing a specific example of various display screens displayed by the display creation unit 224. As shown in FIG. 9, if the main pad 24 is pushed (light push or hard push) when the song list is being displayed on the display unit 22, the display creation unit 224 creates the playback screen. The display creation unit 224 switches the screen from the song list to the playback screen gradually as shown in FIG. 11. The layouts of the playback screen, the jacket navigation screen and the playback control screen shown in FIG. 9 are described later with reference to FIGS. 11 to 13.

Further, if the main pad 24 is touched when the playback screen is being displayed on the display unit 22, the display creation unit 224 creates the jacket navigation screen. On the other hand, the display creation unit 224 creates the song list if the back pad 26 is pushed, and creates the playback control screen if the mode change pad 25 is pushed, when the playback screen is being displayed on the display unit 22.

Figure 12:
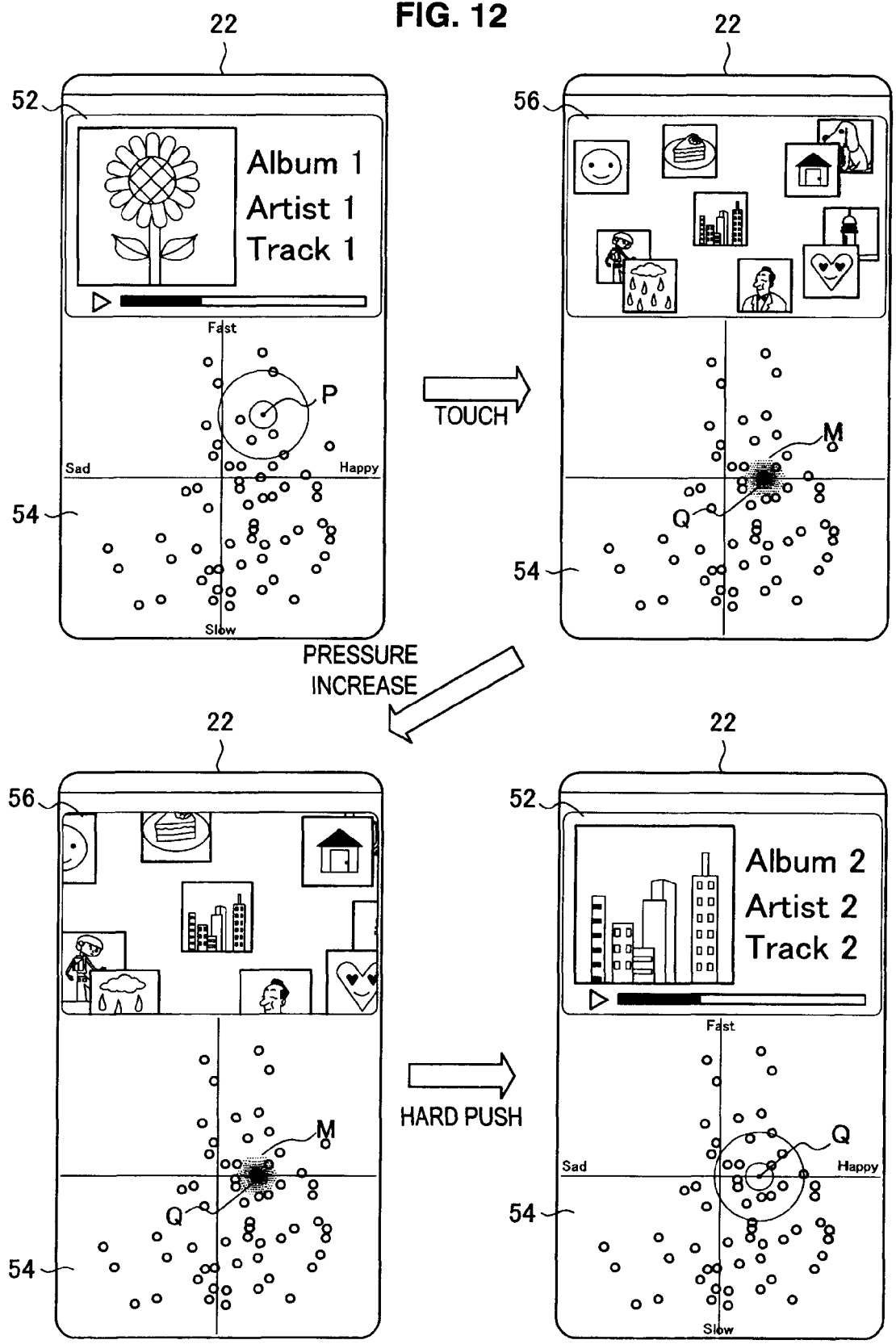
FIG. 12 is an explanatory view showing gradual switching from a jacket navigation screen to a playback screen.

The display creation unit 224 creates the playback screen if the main pad 24 is pushed when the jacket navigation screen is being displayed on the display unit 22, and also creates the playback screen when the finger is released from the main pad 24. Further, the display creation unit 224 creates the playback screen if the mode change pad 25 is pushed, and creates the song list if the back pad 26 is pushed, when the playback control screen is being displayed on the display unit 22. The display creation unit 224 switches the screen from the jacket navigation screen to the playback screen gradually as shown in FIG. 12.

The song list is a list screen of a plurality of pieces of music data, and it may be a playlist track screen, an artist track screen, an album track screen, all track screen, a channel track screen, a genre track screen or the like. The flow of transition of the display screen to such a song list is described hereinafter with reference to FIG. 10. In the following description, the term "track" is used in an equivalent sense to music data.

Figure 10:
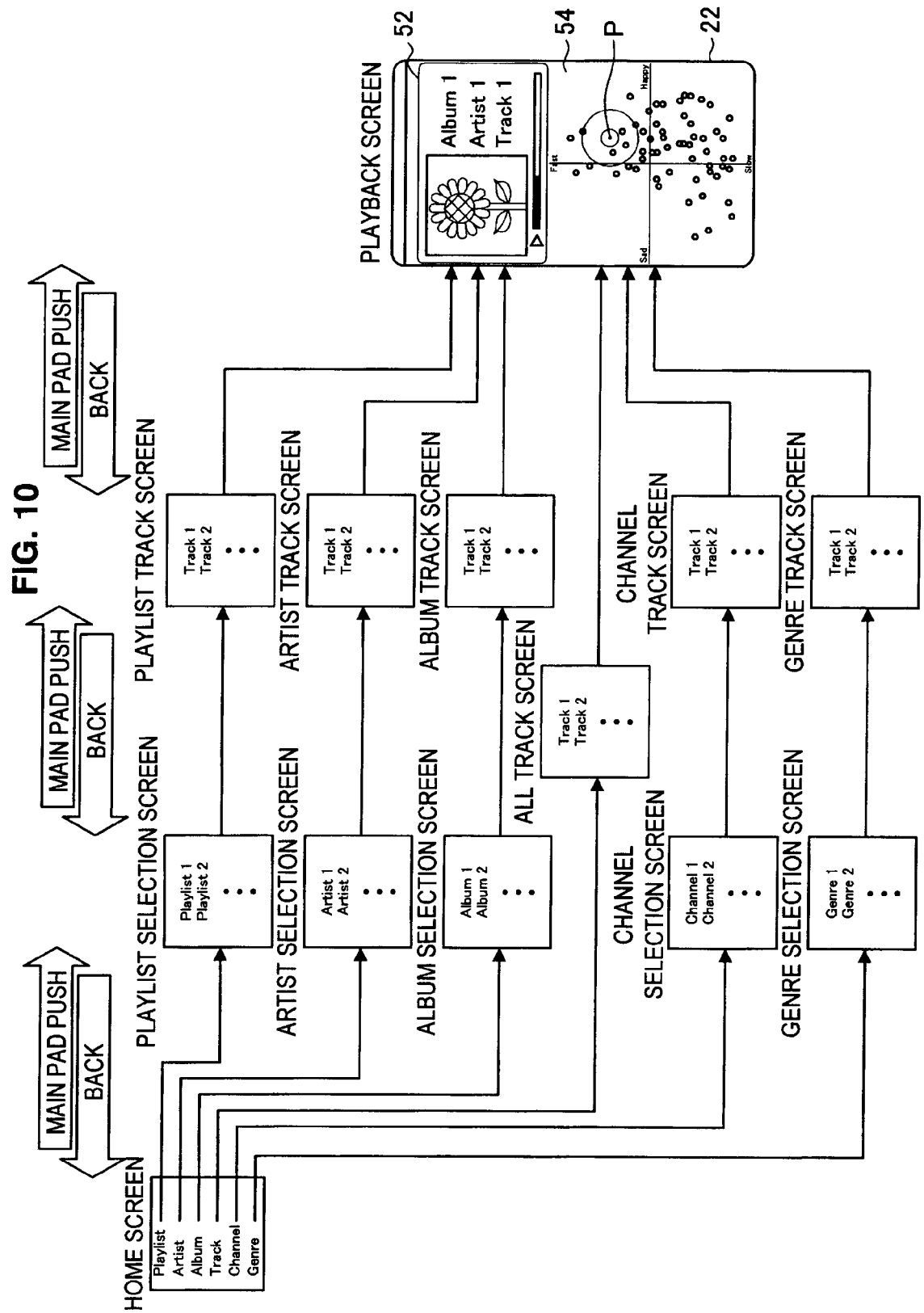
FIG. 10 is an explanatory view showing the flow of transition of a display screen from a home screen to a song list.

FIG. 10 is an explanatory view showing the flow of transition of the display screen from the home screen to the song list. As shown in FIG. 10, the home screen contains selection items "Playlist", "Artist", "Album", "Track", "Channel" and "Genre". If "Playlist" is selected on the home screen by pushing the main pad 24, the display creation unit 224 creates a playlist selection screen that contains a plurality of playlist names as selection items. Further, if one playlist name is selected on the playlist selection screen by pushing the main pad 24, the display creation unit 224 creates a playlist track screen that contains names of tracks belonging to the selected playlist.

If "Artist" is selected on the home screen by pushing the main pad 24, the display creation unit 224 creates an artist selection screen that contains a plurality of artist names as selection items. Further, if one artist name is selected on the artist selection screen by pushing the main pad 24, the display creation unit 224 creates an artist track screen that contains names of tracks by the selected artist.

If "Album" is selected on the home screen by pushing the main pad 24, the display creation unit 224 creates an album selection screen that contains a plurality of album names as selection items. Further, if one album name is selected on the album selection screen by pushing the main pad 24, the display creation unit 224 creates an album track screen that contains names of tracks belonging to the selected album.

If "Track" is selected on the home screen by pushing the main pad 24, the display creation unit 224 creates an all track screen that contains track names of the tracks stored in the storage unit 220 as selection items.

If "Channel" is selected on the home screen by pushing the main pad 24, the display creation unit 224 creates a channel selection screen that contains a plurality of channel names as selection items. Further, if one channel name is selected on the channel selection screen by pushing the main pad 24, the display creation unit 224 creates a channel track screen that contains names of tracks belonging to the selected channel. The channel may be "Active", "Relax", "Emotional", "Happy", or the like, for example.

Likewise, if "Genre" is selected on the home screen by pushing the main pad 24, the display creation unit 224 creates a genre selection screen that contains a plurality of genre names as selection items. Further, if one genre name is selected on the genre selection screen by pushing the main pad 24, the display creation unit 224 creates a genre track screen that contains names of tracks belonging to the selected genre. If the back pad 26 is pushed on each screen described above, the display creation unit 224 creates the screen that has been created just before again.

Referring then to FIG. 11, the way the display creation unit 224 gradually switches the song list to the playback screen is described hereinafter.

FIG. 11 is an explanatory view showing gradual switching from the song list to the playback screen. As shown in the upper left part of FIG. 11, the song list contains regions respectively corresponding to a plurality of tracks, and each region contains a jacket picture, a track name, an artist name and so on. For example, a region 46 contains a track name "Track1", an artist name "Artist1" and a jacket picture.

In the state where the song list is created by the display creation unit 224 and displayed on the display unit 22, if the contact relationship between a user's finger and the main pad 24 becomes "touch", the display creation unit 224 visually raises the region that includes the point position from the song list. For example, if the point position is included in the region 46, the display creation unit 224 visually raises the region 46 from the song list as shown in the upper right part of FIG. 11.

At the same time, the playback control unit 232 may control the playback unit 236 to perform preview playback of the track corresponding to the region 46 from its chorus. The playback unit 236 has a track decoding function, an audio output function or the like.

Then, as the finger pressure on the main pad 24 increases, the display creation unit 224 enlarges the region 46 and further adds "Alubum1" as more specific track information to the region 46 as shown in the lower left part of FIG. 11. Further, if the contact relationship between the user's finger and the main pad 24 becomes "hard push", the display creation unit 224 creates the playback screen of the track corresponding to the region 46 as shown in the lower right part of FIG. 11. At the same time, the playback control unit 232 causes the playback unit 236 to start normal playback of the track corresponding to the region 46.

As described above, in this embodiment, it is possible to perform switching from the song list to the playback screen gradually according to the contact relationship between the finger and the main pad 24 or the pressure on the main pad 24.

The layout of the playback screen is described hereinafter with reference to the lower right part of FIG. 11. As shown in the lower right part of FIG. 11, the playback screen contains a track information display 52 and a coordinate plan 54. The track information display 52 contains information display such as a track name, an artist name, an album name, a jacket picture or the like of the track being played back by the playback unit 236.

The horizontal axis of the coordinate plan 54 indicates the degree of happiness a user feels from the track, and the vertical axis of the coordinate plan 54 indicates tempo of the track. Further, in the coordinate plan 54, track plots (small circles in the coordinate plan 54) that respectively correspond to a plurality of tracks are arranged in the positions in accordance with the degree of happiness a user feels from the track and the tempo of the track.

Specifically, the track plot of a track that is determined to cause a user to feel happier is located in the positive direction of the horizontal axis in the coordinate plan 54. Further, the track plot of a track with higher tempo is located in the positive direction of the vertical axis in the coordinate plan 54. Because track plots respectively corresponding to a plurality of tracks are arranged in the coordinate plan 54 as described above, the coordinate plan 54 may be regarded as a list screen of tracks (content data, music data). The degree of happiness a user feels and the tempo can be specified by the feature data, and the feature data may be acquired by analyzing each track in the playback apparatus 20.

Further, the display creation unit 224 superimposes a ripple centered at the track plot corresponding to the track currently played back by the playback unit 236 (which is the track plot P in the coordinate plan 54 shown in the lower right of FIG. 11) on the coordinate plan 54.

Referring next to FIG. 12, the way the display creation unit 224 gradually switches the jacket navigation screen to the playback screen is described hereinafter.

FIG. 12 is an explanatory view showing gradual switching from the jacket navigation screen to the playback screen. In the state where the playback screen shown in the upper left part of FIG. 12 is displayed on the display unit 22, if the contact relationship between the main pad 24 and a finger becomes "touch", the display creation unit 224 creates the jacket navigation screen shown in the upper right part of FIG. 12.

As shown in the upper right part of FIG. 12, the jacket navigation screen contains a coordinate plan 54 and a jacket picture display frame 56. The center of a cursor M in the coordinate plan 54 corresponds to the point position by the finger.

The jacket picture display frame 56 contains jacket pictures of tracks corresponding to track points that are located on the periphery of the point position. The positional relationship of the respective jacket pictures in the jacket picture display frame 56 coincides with the positional relationship of the track points in the coordinate plan 54.

The display creation unit 224, however, sets the center of the jacket picture display frame 56 as the position of the jacket picture of the track corresponding to the track plot that is closest to the point position by the finger. For example, in the upper right part of FIG. 12, because the point position is in the closest proximity to the track plot Q, the display creation unit 224 places the jacket picture of the track corresponding to the track plot Q at the center of the jacket picture display frame 56.

While the contact relationship between the finger and the main pad 24 is "touch", a user can select an arbitrary track (track plot) in the coordinate plan 54 by moving the point position. As the point position by the finger moves, the position of the cursor M and the display contents in the jacket picture display frame 56 shown in the upper right part of FIG. 12 change accordingly.

If the finger is released from the main pad 24 without the contact relationship between the finger and the main pad 24 becoming "light push", the display creation unit 224 creates the playback screen shown in the upper left part of FIG. 12 again. Further, the playback control unit 232 causes the playback unit 236 to play back the track that has been played back before switching to the jacket navigation screen, starting from the playback position at the time when the playback screen is switched to the jacket navigation screen.

Further, the playback control unit 232 causes the playback unit 236 to perform preview playback of the track corresponding to the track plot that is closest to the point position by the finger, starting from its chorus. Therefore, although the track corresponding to the track plot Q is played back by the playback unit 236 at the stage shown in the upper right part of FIG. 12, a track that is played back by the playback unit 236 changes as the point position moves.

Then, as the pressure by the finger on the main pad 24 increases on the jacket navigation screen shown in the upper right part of FIG. 12 in the display unit 22, the display creation unit 224 enlarges the jacket picture in the jacket picture display frame 56 as shown in the lower left part of FIG. 12. If the contact relationship between the finger and the main pad 24 becomes "light push", the playback control unit 232 tentatively determines the track (track point) that is selected when becoming "light push" as a playback target. Therefore, while the contact relationship between the finger and the main pad 24 is "light push", the jacket navigation screen and the preview playback do not change even if the finger moves on the main pad 24.

Further, if the contact relationship between the finger and the main pad 24 becomes "hard push", the display creation unit 224 creates the playback screen of the track that is tentatively determined as a playback target as shown in the lower right part of FIG. 12. At the same time, the playback control unit 232 causes the playback unit 236 to start normal playback of the track that is tentatively determined as a playback target.

As described above, in this embodiment, it is possible to perform switching from the jacket navigation screen to the playback screen gradually according to the contact relationship between the finger and the main pad 24 or the pressure on the main pad 24. Further, in this embodiment, the track that is selected on the jacket navigation screen when the contact relationship between the finger and the main pad 24 becomes "light push" is tentatively determined as a playback target. Accordingly, even if the original point position changes due to a change in the contact area, the contact shape, the barycentric position or the like of the finger with the main pad 24 while the contact relationship changes from "light push" to "hard push", the playback target track can be maintained. It is thereby possible to reflect user's intention on operations more accurately in this embodiment.

Referring then to FIG. 13, the way the display creation unit 224 switches the playback screen and the playback control screen is described hereinafter.

FIG. 13 is an explanatory view showing switching between the playback screen and the playback control screen. If the pressure by a finger on the mode change pad 25 increases in the state where the playback screen is displayed on the display unit 22 as shown in the left part of FIG. 13, the display creation unit 224 switches the track information display 52 to a playback control display 58 and further moves the playback control display 58 downward. The playback control display 58 contains a plurality of playback control items 59 for a user to designate rewind, pause, fast forward and so on. A user can designate playback control of a track by selecting any one of the plurality of playback control items 59.

2-3. Adjustment of Playback Volume

A method of adjusting playback volume is described hereinafter with reference to FIGS. 14 and 15.

Figure 14:
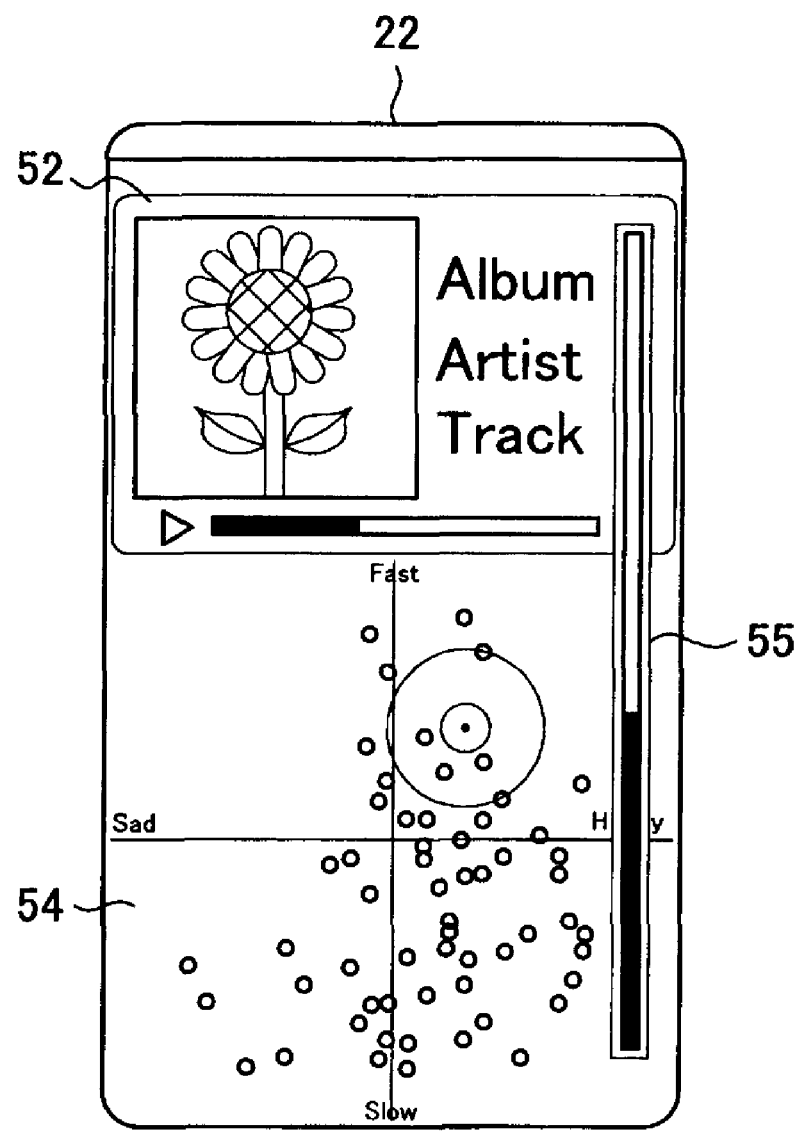
FIG. 14 is an explanatory view showing a playback screen containing a volume bar.

FIG. 14 is an explanatory view showing a playback screen containing a volume bar 55. FIG. 15 is an explanatory view showing a volume adjustment method. As shown in FIG. 14, if contact between the volume control pad 28 shown in FIG. 1 and a finger is detected, the display creation unit 224 creates the playback screen that contains the volume bar 55 indicating the current volume with respect to the maximum volume.

Figure 15:
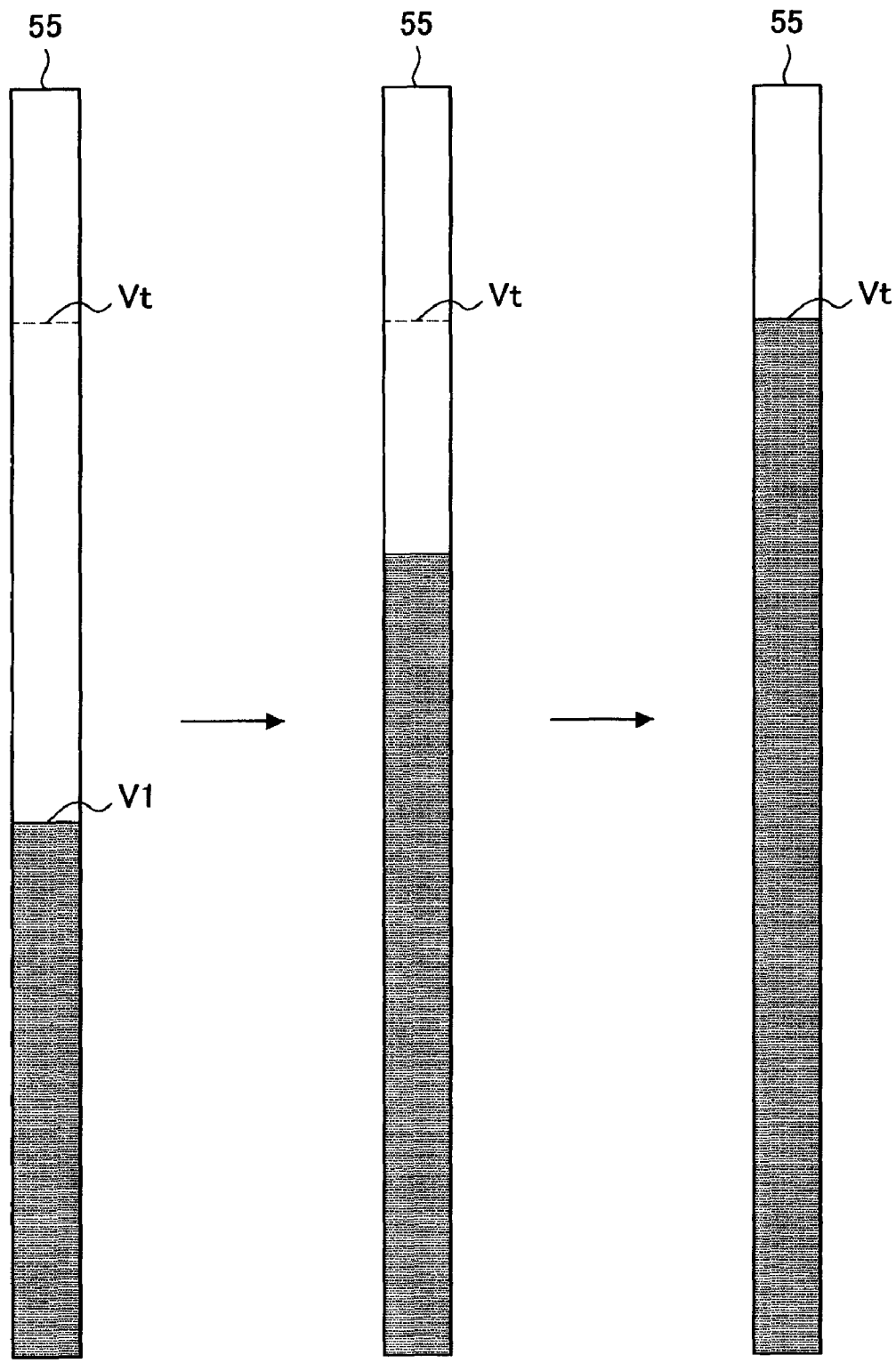
FIG. 15 is an explanatory view showing a volume adjustment method.

Consider, for example, a case where contact between a finger and the position of the volume control pad 28 corresponding to volume Vt is detected when the current volume is V1 as shown in the left part of FIG. 15. In such a case, as the pressure by the finger on the volume control pad 28 increases, the display creation unit 224 raises the current volume position in the volume bar 55 as shown in the middle part of FIG. 15, and the playback control unit 232 causes the playback unit 236 to increase the playback volume.

Further, if the pressure by the finger on the volume control pad 28 increases and the contact relationship between the finger and the volume control pad 28 becomes "hard push", the playback control unit 232 causes the playback unit 236 to increase the playback volume up to the volume Vt that corresponds to the contact position between the finger and the volume control pad 28. Further, the display creation unit 224 raises the current volume position in the volume bar 55 up to the volume Vt.

As described above, in this embodiment, it is possible to adjust the playback volume of a track by the playback unit 236 according to the contact position between the volume control pad 28 and a finger and the pressure by the finger on the volume control pad 28. Although FIG. 1 illustrates the case where the volume control pad 28 is placed on the same surface as the display unit 22 of the playback apparatus 20, the volume control pad 28 may be placed on the side surface of the playback apparatus 20.

2-4. Adjustment of Sensitivity for Operation

Figure 16:
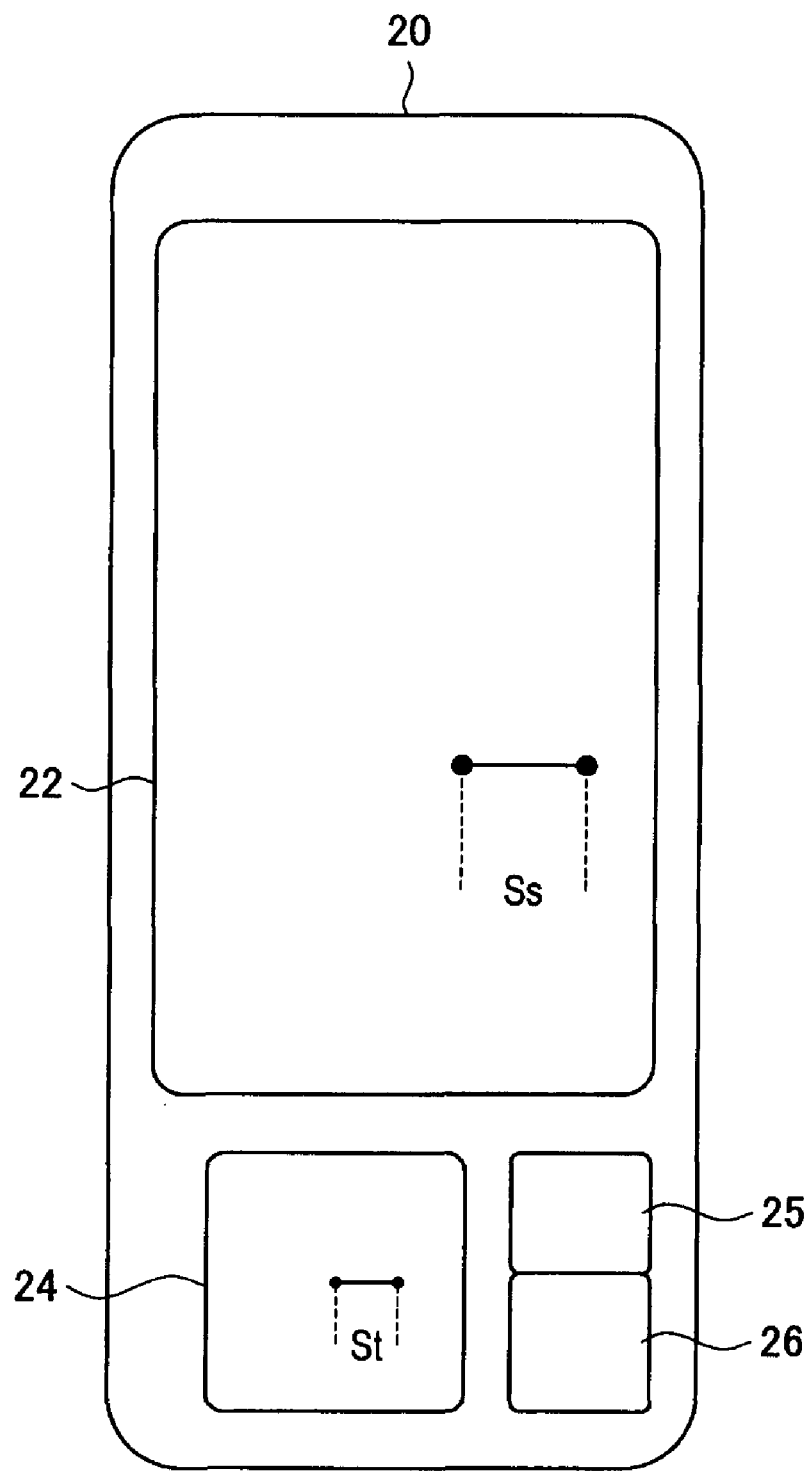
FIG. 16 is an explanatory view showing relationship between a moving amount of a finger on a main pad and a shift amount of a point position.

Referring now to FIG. 16, the sensitivity of the shift amount of the point position with respect to the moving amount of a finger on the main pad 24 is described hereinafter.

FIG. 16 is an explanatory view showing relationship between the moving amount of a finger on the main pad 24 and the shift amount of the point position. As shown in FIG. 16, the moving amount of a finger on the main pad 24 is St, a lower threshold of the pressure range of the contact relationship "touch" is Tt, an upper threshold (a threshold between the contact relationship "touch" and "light push") is Tp, and the pressure currently applied on the main pad 24 is P. Further, if a prescribed coefficient is a, a shift amount Ss of the point position by a finger on the display unit 22 which is detected by the point position detection unit 218 can be represented by the following expressions:

$$\text{If } Tt \leq P \leq Tp, Ss = St*a*(1-(P-Tt)/(Tp-Tt)) \qquad \text{Expression 1:}$$

$$\text{If } P > Tp, Ss = 0 \qquad \text{Expression 2:}$$

As represented by Expression 1, if $Tt \leq P \leq Tp$, the shift amount Ss of the point position becomes smaller as the pressure P increases. Accordingly, as the pressure P increases, the amount of change in the point position by the finger on the list screen becomes smaller, so that the sensitivity of the shift amount Ss of the point position with respect to the moving distance of the finger on the main pad 24 can become lower. Then, if the pressure P becomes equal to the threshold Tp, the shift amount Ss of the point position becomes zero regardless of the moving amount St of the finger on the main pad 24 as represented by Expression 2. While the pressure P is larger than the threshold Tp, the shift amount Ss of the point position is zero regardless of the moving amount St of the finger on the main pad 24 as represented by Expression 2, so that the point position when exceeding the threshold Tp is maintained.

In such a structure, even if the contact area, the contact shape, the barycentric position or the like of the finger with the main pad 24 changes with an increase in the pressure P, it is possible to suppress or eliminate the shift amount Ss of the point position due to the change.

2-5. Adjustment of Moving Speed of Point Position for Operation

Although FIG. 16 shows the case where the point position on the list screen shifts by the moving amount (shift amount) Ss, the point position, in practice, shifts little by little in units of frames and reaches the moving amount Ss. The moving amount in each frame is described hereinafter in detail with reference to FIGS. 16 and 21.

Figure 21:
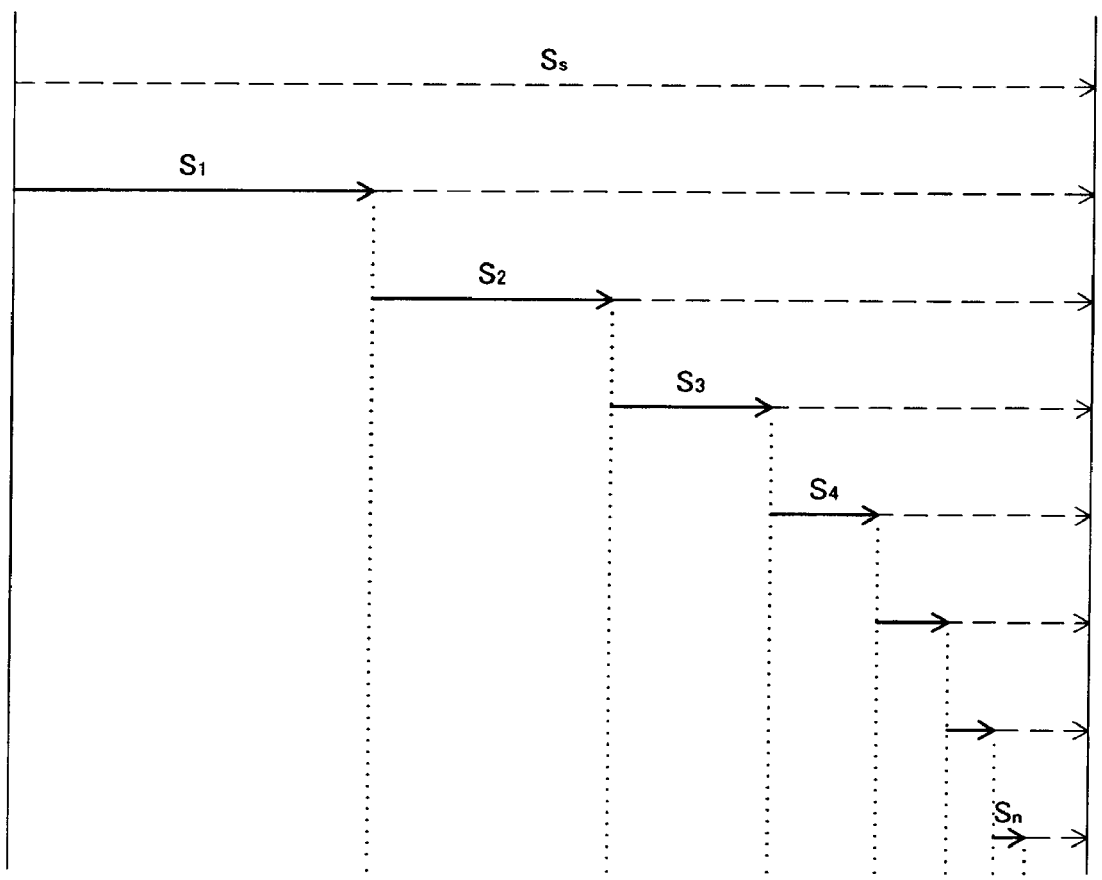
FIG. 21 is an explanatory view showing a moving amount of a point position in each frame.

FIG. 21 is an explanatory view showing the moving amount of the point position in each frame. In FIG. 21, a moving amount Sn indicates the moving amount of the point position in the n-th frame. The moving amount Sn is represented by the following expression:

$$Sn = Q*(Ss-(S_1+S_2+S_3+S_4+\ldots+S_{n-1})) \qquad \text{Expression 3:}$$

In Expression 3, Q is a coefficient having a value from 0 to 1. As shown in Expression 3, the moving amount in each frame is a value obtained by multiplying the remaining moving distance by Q (e.g. ⅓). Further, because the moving amount of the point position in each frame decreases as the value of Q is smaller as shown in Expression 3, a user feels that the moving speed of the point position decreases.

If a lower threshold of the pressure range of the contact relationship "touch" is Tt, an upper threshold is Tp, the pressure currently applied on the main pad 24 is P and a prescribed coefficient is b, Q is represented as follows in this embodiment:

$$\text{If } Tt \leq P \leq Tp, Q = b*(1-(P-Tt)/(Tp-Tt)) \qquad \text{Expression 4:}$$

$$\text{If } P > Tp, Q = 0 \qquad \text{Expression 5:}$$

As represented by Expression 4, if $Tt \leq P \leq Tp$, the value of Q becomes smaller as the pressure P increases. Accordingly, the moving amount of the point position in each frame becomes smaller, and the moving speed of the point position with respect to the moving amount Ss decreases. Then, if the pressure P becomes equal to the threshold Tp, the value of Q becomes zero as represented by Expression 5, and therefore the point position on the list screen ceases to move regardless of the moving amount St of the finger on the main pad 24. In this manner, by decreasing the value of Q with an increase in the pressure P, it is possible to decrease the moving speed of the point position on the list screen. This method may be used in place of the method described in the above [2-4. Adjustment of Sensitivity for Operation] or may be used in combination with the method described in the above [2-4. Adjustment of Sensitivity for Operation].

2-6. Vibration Control Based on Beat

As described above, the playback control unit 232 controls the playback unit 236 to perform preview playback of the track corresponding to the point position by the finger on the jacket navigation screen from its chorus, and further controls the playback unit 236 to perform normal playback of the track based on "hard push". In this embodiment, the vibration control unit 240 controls the vibrator 244 to vibrate in synchronization with the preview playback and the normal playback.

For example, the vibration control unit 240 may vibrate the vibrator 244 at a certain timing of the beat of the track being played back in synchronization with the track currently played back by the playback unit 236. The beat corresponds to the pulse in the rhythm of music and it tends to appear in the low frequency band. Thus, the vibration control unit 240 may vibrate the vibrator 244 at the timing when the signal strength in the low frequency band of the track becomes equal to or higher than a given strength.

The timing of the beat may be analyzed in advance and stored as the feature data in the storage unit 220. Further, the vibration control unit 240 may adjust the intensity of vibration of the vibrator 244 according to the strength of the beat. The beat may be detected by an arbitrary method disclosed in Japanese Unexamined Patent Publication No. 2007-199306, 2007-33851 or the like, for example.

3. Operation of Playback Apparatus According to Embodiment

The structure of the playback apparatus 20 according to the embodiment is described in the foregoing with reference to FIGS. 3 to 17. In the following, a playback method executed in the playback apparatus 20 according to the embodiment is described with reference to FIG. 17.

Figure 17:
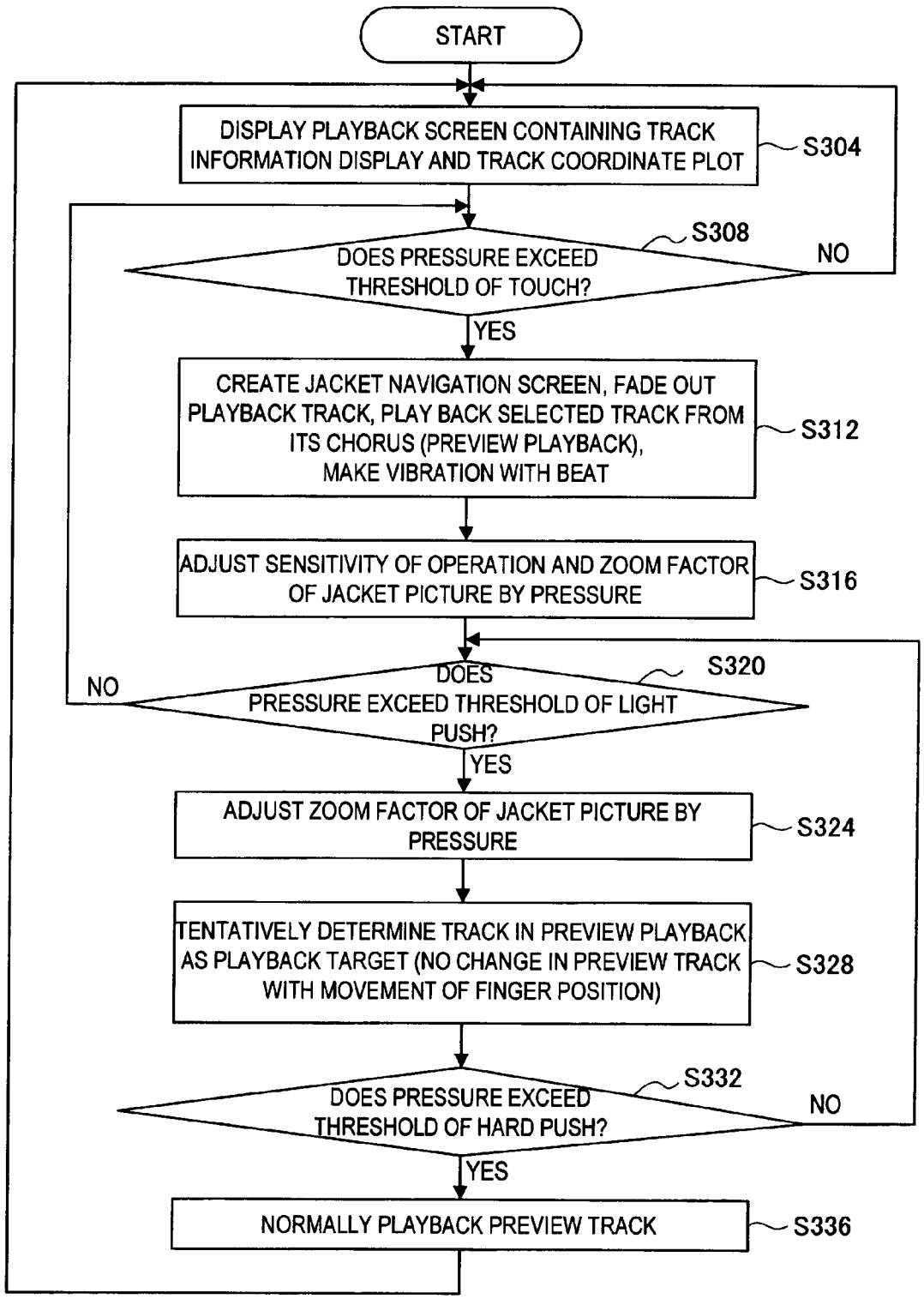
FIG. 17 is a flowchart showing the flow of a playback method executed in a playback apparatus according to an embodiment.

FIG. 17 is a flowchart showing the flow of the playback method executed in the playback apparatus 20 according to the embodiment. First, the display creation unit 224 of the playback apparatus 20 creates the playback screen that contains the track information display and the track coordinate plan, and the playback screen is displayed on the display unit 22 (S304). Then, the contact relationship detection unit 214 determines whether the average value of the pressure detected by the pressure sensor 208 exceeds the threshold of the contact relationship "touch" (S308).

If the average value of the pressure exceeds the threshold of the contact relationship "touch", the display creation unit 224 creates the jacket navigation screen, and the playback control unit 232 fades out the track being played back by the playback unit 236. Further, the playback control unit 232 causes the playback unit 236 to perform preview playback of the track corresponding to the track plot selected on the jacket navigation screen starting from its chorus, and the vibration control unit 240 vibrates the vibrator 244 in accordance with the preview playback (S312).

Then, the point position detection unit 218 adjusts the sensitivity of the shift amount of the point position with respect to the moving amount of a finger according to the average value of the pressure detected by the pressure sensor 208. Further, the display creation unit 224 adjusts the zoom factor of the jacket picture contained in the jacket navigation screen according to the average value of the pressure detected by the pressure sensor 208 (S316).

If the average value of the pressure exceeds the threshold of the contact relationship "light push" (S320), the display creation unit 224 also adjusts the zoom factor of the jacket picture contained in the jacket navigation screen according to the average value of the pressure (S324). On the other hand, the playback control unit 232 tentatively determines the track in preview playback by the playback unit 236 as a playback target (S328). Accordingly, the shift amount of the point position with respect to the moving amount of the finger becomes zero, and the track in preview playback does not change with movement of the finger.

Further, if the average value of the pressure exceeds the threshold of the contact relationship "hard push" (S332), the playback control unit 232 causes the playback unit 236 to perform normal playback of the track in preview playback that has been tentatively determined as a playback target (S336). After that, the process returns to the processing of S304, and the display creation unit 224 creates the playback screen of the track being played back by the playback unit 236, and a series of processing is repeated.

4. Other Examples of Operation

Other examples of operation of the playback apparatus 20 according to the embodiment are described hereinafter.

4-1. Alternative Example of Switching of Display Screens

Figure 18:
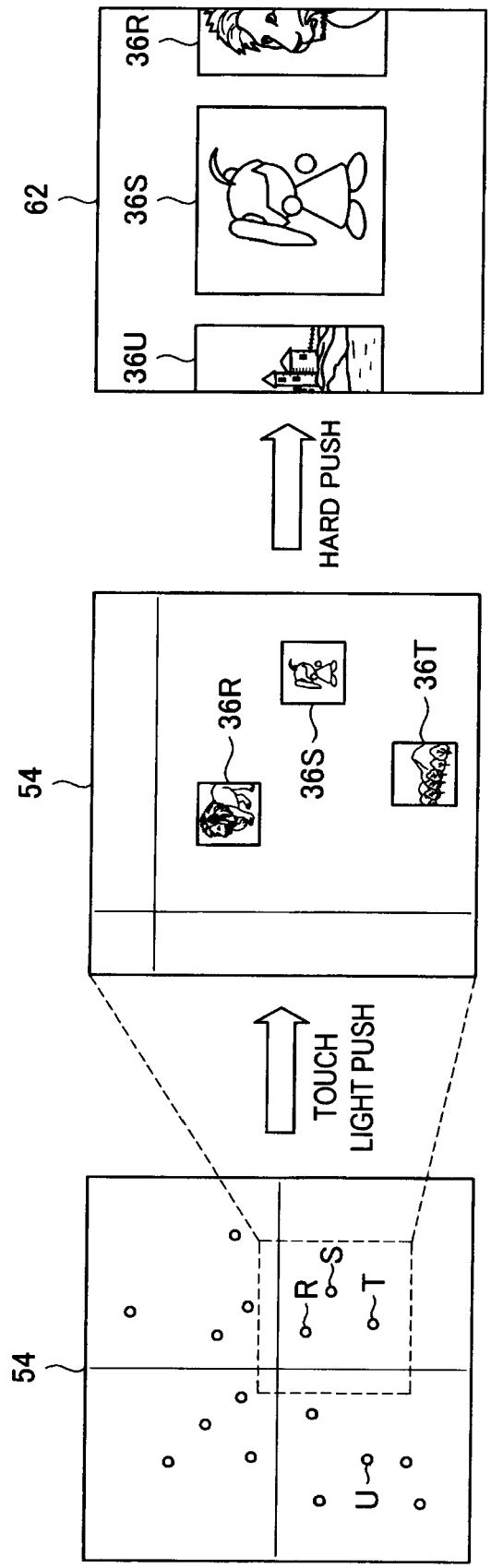
FIG. 18 is an explanatory view showing switching of a coordinate plan to a playback screen according to an alternative example.

Referring first to FIG. 18, an alternative example of switching of display screens is described hereinafter. FIG. 18 is an explanatory view showing switching of the coordinate plan 54 to a playback screen 62 according to the alternative example. In the coordinate plan 54 shown in the left part of FIG. 18, if the contact relationship "touch" or "light push" at the point position in the vicinity of a track plot S is detected, the display creation unit 224 enlarges a part in the vicinity of the track plot S in the coordinate plan 54 as shown in the middle part of FIG. 18.

Further, the display creation unit 224 displays jacket pictures of corresponding tracks in place of track points in the track plot positions included in the enlarged part of the coordinate plan 54, as shown in the middle part of FIG. 18 (preview screen). Specifically, the middle part of FIG. 18 shows an example in which jacket pictures 36R, 36S and 36T of tracks corresponding to track plots R, S and T, respectively, are displayed. In the state shown in the middle part of FIG. 18, the playback control unit 232 causes the playback unit 236 to perform preview playback of the track corresponding to the jacket picture in the closest proximity to the point position by the finger.

Furthermore, if the contact relationship becomes "hard push" in the state shown in the middle part of FIG. 18, the display creation unit 224 creates the playback screen 62 according to the alternative example by arranging jacket pictures in such a way that the selected jacket picture is placed at the center shown in the right part of FIG. 18. Further, the playback control unit 232 causes the playback unit 236 to start normal playback of the track corresponding to the selected jacket picture.

The display creation unit 224 may arrange jacket pictures in the order of the tempo of corresponding tracks. The right part of FIG. 18 shows an example in which the jacket picture 36R that is closest to the jacket picture 36S in the upper side of the vertical axis indicating the tempo is placed on the right side of the jacket picture 36S, and a jacket picture 36U that is closest to the jacket picture 36S in the lower side of the vertical axis indicating the tempo is placed on the left side of the jacket picture 36S. The criterion for arrangement of jacket pictures is not limited to the tempo, and an arbitrary parameter or a combination of arbitrary parameters may be used.

4-2. Coordinate Plan in Selection Screens

Figure 19:
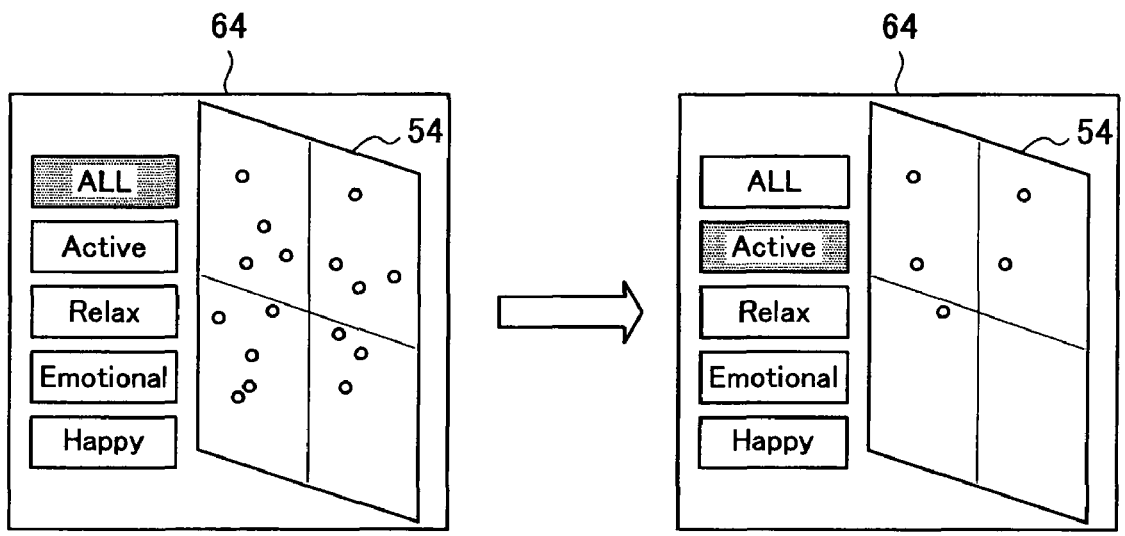
FIG. 19 is an explanatory view showing an example of layout of a channel selection screen.

Referring next to FIG. 19, an example in which selection screens such as the playlist selection screen, the album selection screen and the channel selection screen that are described earlier with reference to FIG. 10 contain the coordinate plan is described hereinafter.

The display creation unit 224 displays track plots of tracks belonging to a selection item at which the point position by a finger is placed on each selection screen in the coordinate plan contained in each selection screen. This is described specifically hereinbelow, taking a channel selection screen 64 as an example.

FIG. 19 is an explanatory view showing an example of layout of the channel selection screen 64. As shown in the left part of FIG. 19, the channel selection screen 64 contains selection items such as "ALL", "Active", "Relax", "Emotional", and "Happy", and the coordinate plan 54. Because the point position by a finger is placed at the selection item "ALL" in the left part of FIG. 19, the display creation unit 224 displays the track points of tracks belonging to all channels in the coordinate plan 54.

On the other hand, in the right part of FIG. 19, the point position by the finger is placed at the selection item "Active". In such a case, the display creation unit 224 displays only the track points of tracks belonging to the channel "Active" in the coordinate plan 54 and does not display the other track points in the coordinate plan 54.

In such a structure, the track points in the coordinate plan 54 dynamically change by user operation, so that a user can visually check the distribution of tracks belonging to each selection item in the coordinate plan 54.

4-3. Change in Coordinate Axis Parameter in Coordinate Plan

Figure 20:
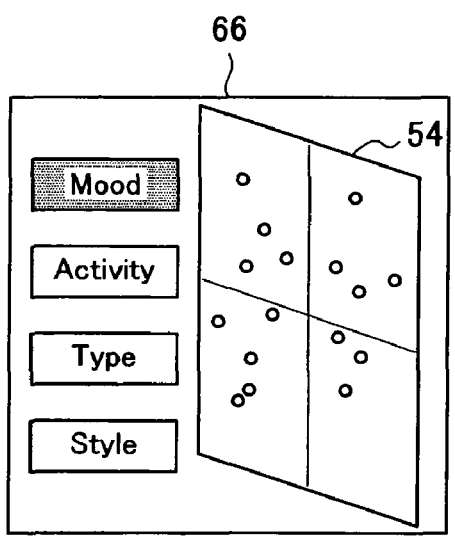
FIG. 20 is an explanatory view showing a change screen of a coordinate axis parameter in a coordinate plan.

Referring then to FIG. 20, a change in the coordinate axis parameter in the coordinate plan 54 is described hereinafter.

FIG. 20 is an explanatory view showing a change screen 66 of the coordinate axis parameter in the coordinate plan 54. As shown in FIG. 20, the coordinate axis parameter change screen 66 contains selection items such as "Mood", "Activity", "Type" and "Style", and the coordinate plan 54.

The above selection items are associated with the meaning of the coordinate axis in the coordinate plan 54. For example, as for "Mood", the positive direction of the horizontal axis is associated with "Happy" and the negative direction of the horizontal axis is associated with "Sad". As for "Activity", the positive direction of the horizontal axis is associated with "Active" and the negative direction of the horizontal axis is associated with "Relax". As for "Type", the positive direction of the horizontal axis is associated with "Electronic" and the negative direction of the horizontal axis is associated with "Acoustic". As for "Style", the positive direction of the horizontal axis is associated with "Rock" and the negative direction of the horizontal axis is associated with "Ballad".

Because the point position by a finger is placed at the selection item "Mood" in the example of FIG. 20, the display creation unit 224 creates the coordinate plan 54 in which a track plot with a higher degree of "Happy" is located in the more positive direction of the horizontal axis. If the point position by a finger is moved to the selection item "Activity", the display creation unit 224 switches the coordinate plan 54 in such a way that a track plot with a higher degree of "Active" is located in the more positive direction of the horizontal axis. The parameters such as "Happy", "Active" and "Electronic" of each track may be stored as the feature data in the storage unit 220.

As described above, a user can change the coordinate axis and the track plot layout of the coordinate plan 54 by selecting any one of the selection items in the coordinate axis parameter change screen 66. Although the case of changing the horizontal axis is described above, change may be made on the vertical axis in the same manner.

5. Summary

As described in the foregoing, in the playback apparatus 20 according to the embodiment, it is possible to switch the display screen from the jacket navigation screen to the playback screen gradually according to the contact relationship between a finger and the main pad 24 or the pressure on the main pad 24. Further, in this embodiment, the track that is selected on the jacket navigation screen when the contact relationship between the finger and the main pad 24 becomes "light push" is tentatively determined as a playback target. Accordingly, even if the original point position changes due to a change in the contact area, the contact shape, the barycentric position or the like of the finger with the main pad 24 while the contact relationship changes from "light push" to "hard push", the playback target track can be maintained. It is thereby possible to reflect user's intention on operations more accurately in this embodiment.

It should be understood by those skilled in the art that various modifications, combinations, sub-combinations and alterations may occur depending on design requirements and other factors insofar as they are within the scope of the appended claims or the equivalents thereof.

For example, although the case where the contact relationship "light push" is used to tentatively determine a playback target track is described above, use of "light push" is not limited thereto. As an alternative example, an object such as an item or a region that exists in the point position by a finger when the contact relationship becomes "light push" may be moved in accordance with the movement of the finger after that. In other words, such an object may be a target of drag-and-drop. Further, the contact relationship between a finger and the main pad 24 may be detected by capturing an image from the touch pad 204 side and detecting the finger position and the contact area based on the luminance component in the image.

Further, it is not always necessary to perform each step in the processing of the playback apparatus 20 of the embodiment in chronological order according to the sequence shown in the flowchart. For example, each step in the processing of the playback apparatus 20 may include processing performed in parallel or individually (e.g. parallel processing or object processing).

Furthermore, it is possible to create a computer program that causes hardware such as CPU, ROM or RAM incorporated in the playback apparatus 20 to perform the equal function to each element of the playback apparatus 20 described above. Further, a storage medium that stores such a computer program may be provided. Each functional block shown in the functional block diagram of FIG. 3 may be implemented by hardware, thereby achieving a series of processing on hardware.

The present application contains subject matter related to that disclosed in Japanese Priority Patent Application JP 2008-218115 filed in the Japan Patent Office on Aug. 27, 2008, the entire content of which is hereby incorporated by reference.

What is claimed is:

1. A playback apparatus comprising:
an operation plane;
a detection unit to detect which of contact relationship including first contact relationship, second contact relationship with a higher degree of contact than the first contact relationship and third contact relationship with a higher degree of contact than the second contact relationship the operation plane and an operation object have;
a creation unit to create a list screen of content data allowing selection of content data based on movement of the operation object with respect to the operation plane when the operation plane and the operation object have the first contact relationship;
a playback unit to play back content data; and
a playback control unit to cause the playback unit to play back content data, which is selected on the list screen when contact relationship between the operation plane and the operation object becomes the second contact relationship from the first contact relationship, if contact relationship between the operation plane and the operation object becomes the third contact relationship from the second contact relationship;
wherein one or more than one content data is associated with a position on the list screen according to a feature of each content data, and
while the operation plane and the operation object are in the first contact relationship, content data associated with a position in closest proximity to a position on the list screen specified by movement of the operation object is selected.

2. The playback apparatus according to claim 1, wherein the playback control unit causes the playback unit to play back content data selected while the operation plane and the operation object are in the first contact relationship from a particular part of the content data.

3. The playback apparatus according to claim 1, wherein a shift amount of the position on the list screen specified by movement of the operation object with respect to the operation plane becomes smaller in relation to the same movement of the operation object as a degree of contact between the operation plane and the operation object increases.

4. The playback apparatus according to claim 1, wherein a moving speed of the position on the list screen specified by movement of the operation object with respect to the operation plane becomes lower in relation to the same movement of the operation object as a degree of contact between the operation plane and the operation object increases.

5. The playback apparatus according to claim 1, wherein the creation unit creates an image display screen containing images respectively indicating selected content data and content data associated with a peripheral position of the content data, in addition to the list screen.

6. The playback apparatus according to claim 5, wherein the creation unit enlarges the images contained in the image display screen as a degree of contact between the operation plane and the operation object increases.

7. The playback apparatus according to claim 6, wherein the creation unit creates a playback screen of content data to be played back when contact relationship between the operation plane and the operation object becomes the third contact relationship.

8. The playback apparatus according to claim 1, wherein the creation unit enlarges a peripheral part of selected content data on the list screen and displays an image indicating content data associated with the peripheral part in a corresponding position when contact relationship between the operation plane and the operation object becomes the second contact relationship.

9. The playback apparatus according to claim 1, wherein the detection unit detects contact relationship between the operation plane and the operation object based on at least one of pressure on the operation plane and a contact area of the operation object with the operation plane.

10. The playback apparatus according to claim 1, wherein the first contact relationship is relationship where the operation plane and the operation object are separated.

11. The playback apparatus according to claim 1, further comprising:
a vibration control unit to vibrate a vibrator according to beat of content data being played back by the playback unit.

12. A playback method comprising the steps of:
detecting which of contact relationship including first contact relationship, second contact relationship with a higher degree of contact than the first contact relationship and third contact relationship with a higher degree of contact than the second contact relationship an operation plane and an operation object have;
creating a list screen of content data allowing selection of content data based on movement of the operation object with respect to the operation plane when the operation plane and the operation object have the first contact relationship; and
playing back content data selected on the list screen when contact relationship between the operation plane and the operation object becomes the second contact relationship from the first contact relationship if contact relationship between the operation plane and the operation object becomes the third contact relationship from the second contact relationship; and
wherein one or more than one content data is associated with a position on the list screen according to a feature of each content data, and
while the operation plane and the operation object are in the first contact relationship, content data associated with a position in closest proximity to a position on the list screen specified by movement of the operation object is selected.

13. A program for causing a computer to function as a playback apparatus comprising:
an operation plane;
a detection unit to detect which of contact relationship including first contact relationship, second contact relationship with a higher degree of contact than the first contact relationship and third contact relationship with a higher degree of contact than the second contact relationship the operation plane and an operation object have;
a creation unit to create a list screen of content data allowing selection of content data based on movement of the operation object with respect to the operation plane when the operation plane and the operation object have the first contact relationship;
a playback unit to play back content data; and
a playback control unit to cause the playback unit to play back content data selected on the list screen when contact relationship between the operation plane and the operation object becomes the second contact relationship from the first contact relationship if contact relationship between the operation plane and the operation object becomes the third contact relationship from the second contact relationship;
wherein one or more than one content data is associated with a position on the list screen according to a feature of each content data, and
while the operation plane and the operation object are in the first contact relationship, content data associated with a position in closest proximity to a position on the list screen specified by movement of the operation object is selected.

* * * * *